US008711846B2

(12) United States Patent
Mahdi et al.

(10) Patent No.: US 8,711,846 B2
(45) Date of Patent: Apr. 29, 2014

(54) NETWORK ATTACHMENT FOR IMS SYSTEMS FOR LEGACY CS UE WITH HOME NODE B ACCESS

(75) Inventors: Kaniz Mahdi, Carrollton, TX (US); Zhaohui Zhang, Guangdong (CN); Chunyan Ding, Guangdong (CN)

(73) Assignee: FutureWei Technologies, Inc., Plano, TX (US)

( * ) Notice: Subject to any disclaimer, the term of this patent is extended or adjusted under 35 U.S.C. 154(b) by 148 days.

(21) Appl. No.: 12/561,825

(22) Filed: Sep. 17, 2009

(65) Prior Publication Data

US 2010/0077459 A1 Mar. 25, 2010

Related U.S. Application Data

(60) Provisional application No. 61/098,095, filed on Sep. 18, 2008, provisional application No. 61/099,424, filed on Sep. 23, 2008, provisional application No. 61/100,999, filed on Sep. 29, 2008, provisional application No. 61/121,452, filed on Dec. 10, 2008, provisional application No. 61/140,373, filed on Dec. 23, 2008, provisional application No. 61/150,667, filed on Feb. 6, 2009, provisional application No. 61/148,889, filed on Jan. 30, 2009.

(51) Int. Cl.

*H04L 12/66* (2006.01)
*H04W 4/00* (2009.01)

(52) U.S. Cl.

USPC .......................................... 370/354; 370/338

(58) Field of Classification Search

USPC .................. 370/259, 354, 338; 455/436, 442; 709/223

See application file for complete search history.

(56) References Cited

U.S. PATENT DOCUMENTS

| | | | |
|---|---|---|---|
| 6,917,810 | B2 | 7/2005 | Julka et al. |
| 7,522,585 | B2 | 4/2009 | Liu et al. |
| 7,975,037 | B2 | 7/2011 | Tai et al. |
| 8,103,267 | B2 | 1/2012 | Lee et al. |

(Continued)

FOREIGN PATENT DOCUMENTS

| | | | |
|---|---|---|---|
| CN | 1756242 | A | 4/2006 |
| CN | 1870553 | A | 11/2006 |

(Continued)

OTHER PUBLICATIONS

3rd Generation Partnership Project, Technical Specification Group Core Network and Terminals, "Handover procedures," Release 7, 3GPP TS 23.009 V7.0.0, Mar. 2007, pp. 1-287.

(Continued)

*Primary Examiner* — Mark Rinehart
*Assistant Examiner* — Gbemileke Onamuti
(74) *Attorney, Agent, or Firm* — Slater & Matsil, L.L.P.

(57) ABSTRACT

A system and method for allowing legacy circuit switch user equipment (CS UE) to operate via a packet switch system, such as an IP Multimedia Subsystem (IMS) system, is provided. The mobility and session control aspects of communications with the legacy CS UE is separated. A user agent is placed in the receiving node (e.g., a home node B) that acts as the SIP agent for the CS UE for session control. An interworking function is provided to allow mobility between the macro CS network and the PS (e.g., IMS) network. Hand-back and hand-in procedures with service continuity are also provided.

17 Claims, 21 Drawing Sheets

(56) References Cited

U.S. PATENT DOCUMENTS

| | | | | |
|---|---|---|---|---|
| 8,243,680 | B2 | 8/2012 | Jung et al. | |
| 2004/0063431 | A1 | 4/2004 | Julka et al. | |
| 2004/0162077 | A1 | 8/2004 | Kauranen et al. | |
| 2006/0098598 | A1 | 5/2006 | Gallagher | |
| 2006/0256752 | A1 | 11/2006 | Svensson et al. | |
| 2006/0268849 | A1 | 11/2006 | Larsson et al. | |
| 2007/0058788 | A1 | 3/2007 | Mahdi et al. | |
| 2007/0061397 | A1 | 3/2007 | Gregorat et al. | |
| 2007/0121608 | A1 | 5/2007 | Gu et al. | |
| 2007/0213078 | A1 | 9/2007 | Shaheen | |
| 2007/0281717 | A1 | 12/2007 | Bharadwaj | |
| 2008/0009287 | A1 | 1/2008 | Donovan et al. | |
| 2008/0032695 | A1* | 2/2008 | Zhu et al. | 455/442 |
| 2008/0090570 | A1* | 4/2008 | Deshpande et al. | 455/436 |
| 2008/0117878 | A1 | 5/2008 | Kim et al. | |
| 2008/0181205 | A1 | 7/2008 | Azada et al. | |
| 2008/0291874 | A1 | 11/2008 | Bae et al. | |
| 2008/0316998 | A1 | 12/2008 | Procopio et al. | |
| 2009/0073933 | A1 | 3/2009 | Madour et al. | |
| 2009/0086719 | A1 | 4/2009 | Mutikainen et al. | |
| 2009/0104905 | A1 | 4/2009 | DiGirolamo et al. | |
| 2009/0147754 | A1 | 6/2009 | Long et al. | |
| 2009/0156213 | A1* | 6/2009 | Spinelli et al. | 455/436 |
| 2009/0257418 | A1 | 10/2009 | Allen et al. | |
| 2009/0265543 | A1 | 10/2009 | Khetawat et al. | |
| 2010/0041405 | A1 | 2/2010 | Gallagher et al. | |
| 2010/0048216 | A1 | 2/2010 | Sundarraman et al. | |
| 2010/0067493 | A1 | 3/2010 | Mahdi | |
| 2010/0069101 | A1 | 3/2010 | Mahdi et al. | |
| 2010/0074223 | A1 | 3/2010 | Mahdi | |
| 2010/0074224 | A1 | 3/2010 | Mahdi et al. | |
| 2010/0238920 | A1 | 9/2010 | Salkintzis et al. | |
| 2010/0293265 | A1* | 11/2010 | Lindholm et al. | 709/223 |
| 2010/0309822 | A1* | 12/2010 | Witzel et al. | 370/259 |

FOREIGN PATENT DOCUMENTS

| | | | |
|---|---|---|---|
| CN | 101061729 | A | 10/2007 |
| CN | 101166133 | A | 4/2008 |
| CN | 101212386 | A | 7/2008 |
| CN | 101262656 | A | 9/2008 |
| WO | WO 2007/009298 | A1 | 1/2007 |
| WO | WO 2010031349 | A1 | 3/2010 |

OTHER PUBLICATIONS

3rd Generation Partnership Project, Technical Specification Group Core Network and Terminals, "Handover procedures," Release 8, 3GPP TS 23.009 V8.1.0, Mar. 2009, pp. 1-289.

3rd Generation Partnership Project, Technical Specification Group Services and System Aspects, "Support of Short Message Service (SMS) over generic 3GPP Internet Protocol (IP) access," Stage 2, Release 8, 3GPP TS 23.204 V8.2.0, Jun. 2008, pp. 1-37.

3rd Generation Partnership Project, Technical Specification Group Services and System Aspects, "Support of Short Message Service (SMS) over generic 3GPP Internet Protocol (IP) access," Stage 2, Release 8, 3GPP TS 23.204 V8.4.0, Mar. 2009, pp. 1-37.

3rd Generation Partnership Project, Technical Specification Group Services and System Aspects, "Single Radio Voice Call Continuity (SRVCC)," Stage 2, Release 8, 3GPP TS 23.216 V8.0.0, Jun. 2008, pp. 1-20.

3rd Generation Partnership Project, Technical Specification Group Services and System Aspects, "Single Radio Voice Call Continuity (SRVCC)," Stage 2, Release 9, 3GPP TS 23.216 V9.0.0, Jun. 2009, pp. 1-39.

3rd Generation Partnership Project, Technical Specification Group Services and System Aspects, "IP Multimedia Subsystem (IMS)," Stage 2, Release 8, 3GPP TS 23.228 V8.5.0, Jun. 2008, pp. 1-240.

3rd Generation Partnership Project, Technical Specification Group Services and System Aspects, "IP Multimedia Subsystem (IMS)," Stage 2, Release 9, 3GPP TS 23.228 V9.0.0, Jun. 2009, pp. 1-250.

3rd Generation Partnership Project, Technical Specification Group Services and Architecture, "IP Multimedia Subsystem (IMS) Service Continuity," Stage 2, Release 8, 3GPP TS 23.237 V8.0.0, Jun. 2008, pp. 1-40.

3rd Generation Partnership Project, Technical Specification Group Services and Architecture, "IP Multimedia Subsystem (IMS) Service Continuity," Stage 2, Release 9, 3GPP TS 23.237 V9.1.0, Jun. 2009, pp. 1-88.

3rd Generation Partnership Project, Technical Specification Group Services and System Aspects, "IP Multimedia Subsystem (IMS) Centralized Services," Stage 2, Release 8, 3GPP TS 23.292 V8.0.0, Jun. 2008, pp. 1-89.

3rd Generation Partnership Project, Technical Specification Group Services and System Aspects, "IP Multimedia Subsystem (IMS) centralized services," Stage 2, Release 9, 3GPP TS 23.292 V9.2.0, Jun. 2009, pp. 1-105.

3rd Generation Partnership Project, Technical Specification Group Services and System Aspects, "IMS Aspects of Architecture for Home NodeB," Stage 2, Release 9, 3GPP TR 23.832 V0.4.0, May 2009, pp. 1-61.

3rd Generation Partnership Project, Technical Specification Group Services and System Aspects, "IP Multimedia Subsystem (IMS) service continuity enhancements; Service, policy and interaction," Stage 2, Release 9, 3GPP TR 23.838 V9.0.0, Jun. 2009, pp. 1-51.

3rd Generation Partnership Project, Technical Specification Group Core Network and Terminals, "Mobile radio interface Layer 3 specification; Core network protocols," Stage 3, Release 8, 3GPP TS 24.008 V8.2.0, Jun. 2008, pp. 1-553.

3rd Generation Partnership Project, Technical Specification Group Core Network and Terminals, "Mobile radio interface Layer 3 specification; Core network protocols," Stage 3, Release 8, 3GPP TS 24.008 V8.6.0, Jun. 2009, pp. 1-582.

3rd Generation Partnership Project, Technical Specification Group Core Network and Terminals, "IP multimedia call control protocol based on Session Initiation Protocol (SIP) and Session Description Protocol (SDP)," Stage 3, Release 9, 3GPP TS 24.229 V9.0.0, Jun. 2009, pp. 1-623.

3rd Generation Partnership Project, Technical Specification Group Radio Access Network, "UTRAN lu interface RANAP signalling," Release 7, 3GPP TS 25.413 V7.9.0, Jun. 2008, pp. 1-359.

3rd Generation Partnership Project, Technical Specification Group Radio Access Network, "UTRAN lu interface Radio Access Network Application Part (RANAP) signalling," Release 8, 3GPP TS 25.413 V8.3.0, Jun. 2009, pp. 1-398.

3rd Generation Partnership Project, Technical Specification Group Radio Access Network, "UTRAN architecture for 3G Home Node B (HNB)," Stage 2, Release 8, 3GPP TS 25.467 V8.2.0, Jun. 2009, pp. 1-26.

3rd Generation Partnership Project, Technical Specification Group Core Network and Terminals, "Evolved Packet System; 3GPP EPS Sv interface (MME to MSC) for SRVCC," Release 8, 3GPP TS 29.280 V1.0.1, Sep. 2008, pp. 1-10.

3rd Generation Partnership Project, Technical Specification Group Core Network and Terminals, "Evolved Packet System (EPS); 3GPP Sv interface (MME to MSC, and SGSN to MSC) for SRVCC," Release 8, 3GPP TS 29.280 V8.1.0, Mar. 2009, pp. 1-13.

3rd Generation Partnership Project, Technical Specification Group Services and System Aspects, "Security aspects of early IP Multimedia Subsystem (IMS)," Release 8, 3GPP TS 33.178 V1.0.0, Mar. 2008, pp. 1-26.

3rd Generation Partnership Project, Technical Specification Group Services and System Aspects, "3GPP System Architecture Evolution (SAE); Security architecture," Release 8, 3GPP TS 33.401 V8.0.0, Jun. 2008, pp. 1-45.

3rd Generation Partnership Project, Technical Specification Group Services and System Aspects, "3GPP System Architecture Evolution (SAE); Security architecture," Release 9, 3GPP TS 33.401 V9.0.0, Jun. 2009, pp. 1-99.

"Written Opinion of the International Searching Authority," International Application No. PCT/CN2009/074020, Applicant: Huawei Technologies Co., Ltd., et al., Dec. 31, 2009, 5 pages.

(56) References Cited

OTHER PUBLICATIONS

International Search Report and Written Opinion received in International Application No. PCT/CN2009/074020, Date of mailing Dec. 31, 2009, 12 pages.

"3rd Generation Partnership Project; Technical Specification Group Services and System Aspects; Single Radio Voice Call Continuity (SRVCC); Stage 2, Release 8," 3GPP TS 23.216 V8.1.0, Sep. 2008, pp. 1-29.

"3rd Generation Partnership Project; Technical Specification Group Services and System Aspects; IP Multimedia Subsystem (IMS); Stage 2, Release 8," 3GPP TS 23.228 V8.6.0, Sep. 2008, pp. 1-241.

"3rd Generation Partnership Project; Technical Specification Group Services and Architecture; IP Multimedia Subsystem (IMS) Service Continuity;" Stage 2, Release 8, 3GPP TS 23.237 V8.1.0, Sep. 2008, pp. 1-41.

"3rd Generation Partnership Project; Technical Specification Group Services and System Aspects; IP Multimedia Subsystem (IMS) Centralized Services; Stage 2, Release 8," 3GPP TS 23.292 V8.1.0, Sep. 2008, pp. 190.

"3rd Generation Partnership Project; Technical Specification Group Core Network and Terminals; Mobile radio interface Layer 3 specification; Core network protocols, Stage 3, Release 8," 3GPP TS 24.008 V8.3.0, Sep. 2008, pp. 1-556.

"3rd Generation Partnership Project; Technical Specification Group Radio Access Network; UTRAN lu interface RANAP signalling; Release 8," 3GPP TS 25.413 V8.0.0, Sep. 2008, pp. 1-374.

Zhu, X., et al, "Solution to Fixed Mobile Network Convergence: Femtocell," Mobile Communications, May 2008, No. 6, pp. 59-65.

International Search Report and the Written Opinion of the Patent Cooperation Treaty, received in International Application No. PCT/CN2009/074028, Huawei Technologies Co. Ltd., et al., mailed Dec. 31, 2009, 10 pages.

* cited by examiner

NETWORK ATTACHMENT FOR IMS SYSTEMS FOR LEGACY CS UE WITH HOME NODE B ACCESS

This application claims the benefit of U.S. Provisional Application No. 61/099,424, filed on Sep. 23, 2008, entitled "Method of IMS Registration of CS UE Attached to HNB Using a HNB IP Address/Location Binding at the CLF," U.S. Provisional Application No. 61/100,999, filed on Sep. 29, 2008, entitled "HNB-Macro CS Handovers for IMS Based Femto System," U.S. Provisional Application No. 61/121,452, filed on Dec. 10, 2008, entitled "Protocol Details of HNB to Macro CS Handover," U.S. Provisional Application No. 61/140,373, filed on Dec. 23, 2008, entitled "HNB to Macro CS Handover-Single Step Initiation," U.S. Provisional Application No. 61/150,667, filed on Feb. 6, 2009, entitled "IMS Registration by HNB of a CS UE with CS Attach Verification, " U.S. Provisional Application No. 61/098,095, filed on Sep. 18, 2008, entitled "System and Method for Provision of IMS Based Services for Legacy CS UE with Home Node B Access," which applications are hereby incorporated herein by reference. This application further claims the benefit of U.S. Provisional Application No. 61/148,889, filed on Jan. 30, 2009, entitled "IMS Registration by HNB of a CS UE with CS Attach Verification."

CROSS-REFERENCE TO RELATED APPLICATIONS

This application relates to the following co-pending and commonly assigned patent applications: Ser. No. 12/486,645, filed Jun. 17, 2009, entitled "System and Method for Provision of IMS Based Services for Legacy CS UE with Home Node B Access," Ser. No. 12/561,734, filed Sep. 17, 2009, entitled "System and Method for Provision of IMS Based Services for Legacy CS UE with Home Node B Access," Ser. No. 12/561,850, filed Sep. 17, 2009, entitled "CS to IMS Hand-Back and Hand-in for IMS Systems for Legacy CS UE with Home Node B Access," and Ser. No. 12/561,877, filed Sep. 17, 2009, entitled "IMS to CS Handover for IMS Systems for Legacy CS UE with Home Node B Access," which applications are incorporated herein by reference.

TECHNICAL FIELD

The present invention relates generally to telecommunications and, more particularly, to a system and method for providing IP Multimedia Subsystem (IMS)-based services using circuit switch (CS) user equipment (UE) with access over a femtocell system.

BACKGROUND

In telecommunications, a femtocell—originally known as an Access Point Base Station—is a small cellular base station, typically designed for use in residential or small business environments. It connects to the service provider's network via broadband (such as DSL or cable). A femtocell allows service providers to extend service coverage indoors, especially where access would otherwise be limited or unavailable. The femtocell incorporates the functionality of a typical base station, but extends it to allow a simpler, self-contained deployment.

A Node B is an element of a 3G macro Radio Access Network (RAN), and a Home Node B (HNB) is the 3GPP's term for a 3G femtocell. Within an HNB Access Network there are two network elements: a HNB (or femtocell) and a Home Node B Gateway (HNB-GW). The HNB is connected to an existing residential broadband service and provides 3G radio coverage for 3G handsets within a home. The HNB Gateway is installed within an operator's network and aggregates traffic from a large number of HNBs back into an existing core service network.

As mobile devices improve and include more enhanced capabilities, mobile devices have evolved to act as Internet Protocol (IP) devices using the Home Node B as an access point. IP devices typically implement IP Multimedia services (IMS) sessions that utilize packet switch (PS) communications instead of CS communications. Legacy CS devices, however, are unable to communicate with the PS network, and hence, the legacy CS devices are unable to utilize services or take advantage of the capabilities offered by IMS systems or other PS networks.

Thus, there is a need for a method and system that allows the legacy CS devices to gain access to IMS services, particularly when communicating via a femtocell, e.g., a home node B. There is also a need to allow for mobility of the legacy CS devices between CS domains and PS domains.

SUMMARY OF THE INVENTION

These and other problems are generally solved or circumvented, and technical advantages are generally achieved, by preferred embodiments of the present invention which provides for access to IP multimedia (IMS) sessions using a circuit switch (CS) device.

Embodiments of the present invention provide a system and a method for allowing legacy circuit switched user equipment (CS UE) to operate via a packet switch (PS) system, such as an IP Multimedia Subsystem (IMS) system. An embodiment utilizes a femtocell, such as a home node B, or other cell with an agent that interfaces between the CS system utilized by the legacy CS UE and the packet switch system.

In an embodiment, the mobility and session control aspects of communications with a legacy CS UE are separated. A home user agent (HUA) is located in the home node B (HNB) and acts as the SIP agent for the CS UE for session control. An interworking function is provided to allow mobility between the macro CS network and the PS (e.g., IMS) network. When providing legacy services to a CS UE, the HNB gateway (GW) registers with the CS network. In an alternative embodiment, the HNB itself registers with the CS network, thereby providing an additional level of security.

In another embodiment, the CS UE is handed over from the PS domain to the CS domain such that service continuity is maintained for the CS UE by, for example, providing by the HNB the service state information and the origination information to the IWF.

In yet another embodiment, the CS UE is handed back to the PS domain from the CS domain. The hand back may be performed such that a bi-cast downlink bearer channel is established and anchored in the HNB. In an alternative embodiment, the bi-cast downlink bearer channel is anchored in a multimedia resource function (MRF).

In yet still another embodiment, the CS UE is handed in from the CS domain to the PS domain when IMS services are enabled. In this embodiment, a bi-cast downlink bearer channel is anchored in the HNB. In an alternative embodiment, the bi-cast downlink bearer channel is anchored in the media gateway (MGW), and the MGW remains in the bearer path after hand in is completed.

In an embodiment in which IMS services are not enabled, the bearer channel is routed from the HNB through the MGW to the CS Core.

In yet still another embodiment, a handover of a CS UE on which an active session and a held session is established from the PS domain to the CS domain is performed. The handover may be accomplished using a series of radio access network application part (RANAP) messages or a newly created message. Alternatively, an existing message with a new information element that indicates a handover is requested may also be used.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed herein are merely illustrative of specific ways to make and use the invention, and do not limit the scope of the invention.

Embodiments of the present invention are related to provisioning IP Multimedia Subsystem (IMS) services for a legacy CS UE attached to a home node B (HNB) with verification in the core network that the UE has been authenticated and registered. Additional verification may be performed by the core network to verify that the user is authenticated and registered. This verification ensures that the HNB (which is a CPE and hence non trusted entity) does not try to register un-authenticated users in IMS.

Embodiments of the present invention allow user equipment (UE) configured to only provide circuit switch (CS) communications to be verified and authorized for access to the packet switch (PS) network, and hence, IMS services. Embodiments of the present invention will be described with respect to embodiments in a specific context, namely a system and method for the provision of IMS-based services for legacy CS UE with Home Node B Access. Other embodiments of the present invention, however, may be applied to ad hoc networks, cellular networks, wireline networks, and the like, as well as other architectural configurations.

As discussed in greater detail below, an embodiment of the present invention provides a Session Initiation Protocol (SIP) user agent (UA) collocated with the HNB for interworking CS session control procedures with SIP session control procedures. A transport layer interworking function (IWF) is provided for idle mode mobility with collaboration of the SIP UA in the HNB. The IWF in collaboration with the SIP UA in the HNB and a SIP Application Server enables active mode mobility between HNB and macro CS or macro PS networks.

Figure 1:
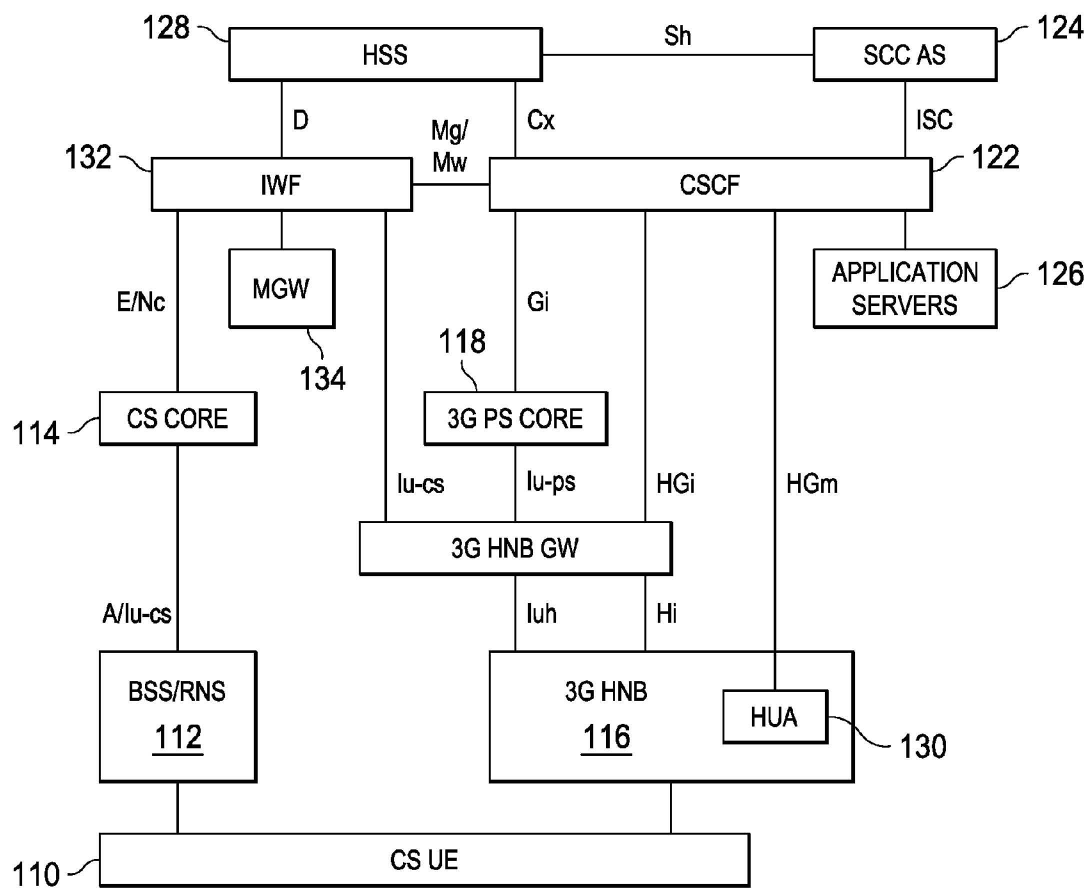
FIG. 1 illustrates a functional architecture diagram in accordance with an embodiment of the present invention.

Referring now to FIG. 1, there is shown a functional architecture diagram in accordance with an embodiment of the present invention. A CS UE 110 comprises a user device and may include any type of device providing voice and/or data access, such as a wireless phone, computer, personal data assistant (PDA), or the like, via a CS communications path. Generally, in legacy systems a CS UE connects via a Base Station Subsystem (BSS)/Radio Network Subsystem (RNS) 112, which provides the connectivity and wireless transmission interface between the CS core 114 and the CS UE 110.

In an IMS system, a HNB 116 acts as an access point, typically within a user's home, to provide a PS connection to the 3G PS core 118 via a 3G HNB Gateway (GW) 120. A traditional IMS session is created between a UE and a remote end (not shown), thereby enabling the UE to access media flows. The session control signaling flow extends between a Call Session Control Function (CSCF) 122 and possibly a Service Centralization Continuity Application Server (SCC AS) 124 or other application servers (126).

Generally, the CSCF 122 processes SIP signaling packets in the IMS system, and the application servers 126 host and execute a variety of services. In one embodiment, the SCC AS 124 operates in a Back-to-Back User Agent (B2BUA) mode wherein it acts as an SIP element to mediate SIP signaling between the UE and the remote end. Application servers may be executed on the remote leg as part of standard service execution logic at the CSCF 122.

A home subscriber server (HSS) 128 provides a subscriber database and contains user-related subscription data, such as location information, security information, user profile information, and the like, required to handle IMS sessions.

One of ordinary skill in the art, however, will realize that the architecture discussed above fails to provide IMS access to legacy CS UE, such as CS UE 110. In accordance with an embodiment of the present invention, a home user agent (HUA) 130 is added to the 3G HNB 116 as illustrated in FIG. 1. The HUA 130 is a logical function that acts as a SIP UA providing SIP session control on behalf of the UE using CS procedures for voice, preferably located with the 3G HNB 116. The HUA 130 provides IMS registration upon a CS attach procedure and interworks CS session/service control with IMS session/service control over an HGm interface point with the CSCF 122, e.g., the IMS system. In a typical femtocell access, a PS UE includes a SIP client for access to the PS core. In this case, however, the HUA 130 acts as the SIP client on behalf of the CS UE 110 (which is not SIP capable), providing translation services between the CS UE 110 and the PS network.

The HUA 130 also initiates PS-to-CS and PS-to-PS service continuity procedures on behalf of the CS UE 110 to provide mobility to the CS UE 110. An IWF 132, which provides functionality similar to a mobile switching center (MSC) in the macro CS network, is responsible for interfacing with the femtocell system to provide handover capability between the CS network of the macro CS core 114 and the 3G HNB 116. The IWF 132 also provides visitor location register (VLR) emulation for CS location updates and interfaces with a media gateway (MGW) 134, which provides translation services between the IMS network and the macro CS network for media flows over the CS network.

It should be noted that other network elements, such as routers, gateways, switches, and/or the like, may be present within the networks. The configurations and the communications between network elements are provided for illustrative purposes only, and as such, the communications between the specified elements may be between different elements and/or through additional elements as well as different signaling/commands may be used.

As discussed in greater detail in the following paragraphs, the general principles of the present invention may be applied to various scenarios. It should be noted that the following embodiments are provided for illustrative purposes only and are not intended to limit the scope of the present invention to only those embodiments described herein. Furthermore, it should be noted that the messages and the message parameters are provided for illustrative purposes only and that other messages and parameters may be used, as well as any suitable protocol, such as session description protocol (SDP), session initiation protocol (SIP), or the like. Additional information regarding the various network elements, interfaces, and message flows may be found in 3GPP TS 23.228, v9.0.0 and 3GPP TS 23.237, v9.1.0, which are incorporated herein by reference.

As one of ordinary skill in the art will appreciate, the architecture discussed above allows a legacy CS UE to use a femtocell system without requiring specialized equipment on the CS UE such that the use of the femtocell system and the IMS system is transparent to the CS UE and the user has full mobility between the IMS femtocell system and the macro CS system. This is provided by the above architecture due to the separation of the session control and mobility components, such that the session control is handled by the HUA 130 in the HNB 116 while the mobility (including location updates and handovers) is handled by the IWF 132 in the CS domain.

Figure 2:
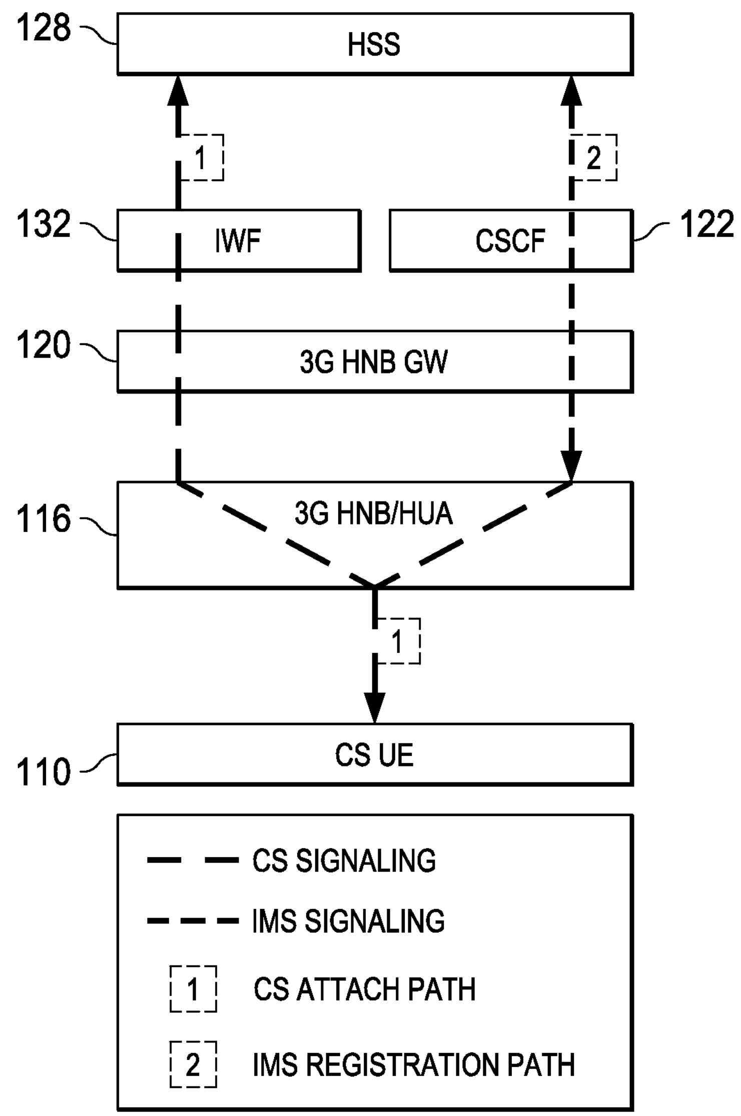
FIG. 2 illustrates a functional architecture diagram for circuit switch user equipment network attachment in accordance with an embodiment of the present invention.

FIG. 2 illustrates a simplified functional architectural diagram in accordance with an embodiment of the present invention to better illustrate the separation of the session control and mobility components. As illustrated in FIG. 2, the CS UE 110 performs a single CS attach procedure with the 3G HNB 116 and the HUA 130, i.e., the femtocell access point. The 3G HNB 116 and the HUA 130 are collectively referred to as the HNB/HUA 116 for the purposes of this discussion.

The HNB/HUA 116 receives the CS attach request and separates the session control and the mobility components. The HNB/HUA 116 initiates two attach procedures. The first attach procedure initiated by the HNB/HUA 116 is a CS attach procedure with the IWF 132 for mobility. A second attach procedure is an IMS registration procedure, such as an early IMS security registration or a NASS-bundled authentication (NBA) security registration. This IMS registration procedure provides access to the IMS system and may include establishing an IPsec tunnel. Accordingly, from the perspective of the CS UE 110, a single CS attach is performed and the CS UE 110 is unaware of the separation of the session control and mobility by the HNB/HUA 116.

Figure 3:
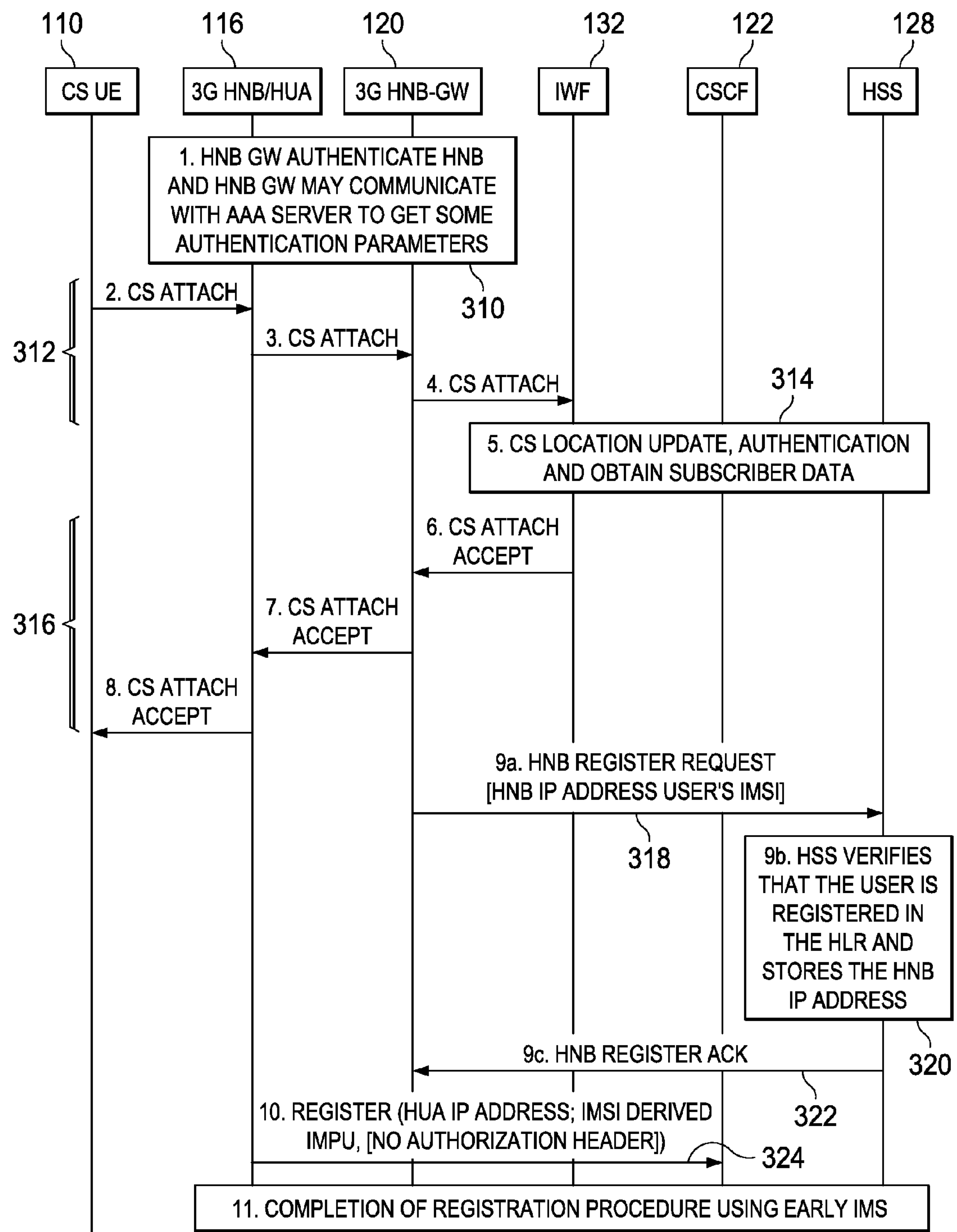
FIG. 3 is a message flow diagram illustrating circuit switch user equipment network attachment in accordance with an embodiment of the present invention.

FIG. 3 is a message flow diagram that further illustrates an attach procedure with verification that may be used in accordance with an embodiment of the present invention. As indicated by reference numeral 310, the HNB GW 120 authenticates the HNB/HUA 116 and the connection between the HNB/HUA 116 and the HNB GW 120. This authentication process may involve, for example, communication with an authentication, authorization, and accounting (AAA) server. Additional information regarding this authentication process may be found in 3GPP TS 25.467, v8.2.0, which is incorporated herein by reference.

In step 312, the CS UE 110 initiates a CS attach procedure by transmitting a CS ATTACH message to the HNB/HUA 116, which transmits the CS ATTACH message to the IWF 132. Upon receiving the CS ATTACH message, the CS location of the CS UE 110 is updated between the IWF 132 and the HSS 128, which may include the appropriate HLR and VLR, in step 314. An authentication procedure is also performed to authenticate the CS UE 110 and to obtain subscriber data as indicated. The subscriber identity may be provided by the IWF 132 as part of radio access network application part (RANAP) common ID procedures, whereas the CS UE 110 identity may be provided by the UE as part of a check in an international mobile equipment identify (IMEI) procedure. Additional information regarding the CS location update and UE registration to the HNB GW 120 may be found in 3GPP TS 25.467, v8.2.0, which is incorporated herein by reference.

After the CS attach procedure is completed, a CS ATTACH ACCEPT message is transmitted from the IWF 132 to the CS UE 110 via the HNB/HUA 116 to signify that the CS attach was successful in step 316. This completes the CS attachment procedure for mobility within the CS domain.

In step 318, the HNB GW 120 transmits an HNB registration message, e.g., an HNB REGISTER REQUEST message, to the HSS 128 upon receipt of the CS ATTACH ACCEPT message. The HNB REGISTER REQUEST message may include the HNB network address, e.g., the IP address, and the identifier for the CS UE 110, e.g., the international mobile subscriber identity (IMSI) associated with the CS UE 110. Upon receipt of the HNB REGISTER REQUEST message, the HSS 128 verifies that the user is registered in the HLR of the CS UE 110 and that the CS attach procedure has been performed via the HNB/HUA 116 that requested the IMS registration as indicated in step 320. This verification procedure may be performed at least in part by using the HNB identity communicated in the HNB REGISTER REQUEST message in the P-Access-Network-Info header. The HSS 128 may also store the network address of the HNB using procedures similar to Gateway GPRS Support Node (GGSN), using the Remote Authentication Dial In User Service (RADIUS) protocol to store the HNB IP address and the user's IMSI in the HSS. Upon successful verification, the HSS 128 transmits an acknowledgement message, e.g., HNB REGISTER ACK message, back to the HNB GW 120, thereby notifying the HNB GW 120 that the CS UE 110 is registered and verified.

In step 324, the HNB/HUA 116 initiates an IMS registration procedure by transmitting a REGISTER message to the CSCF 122. The REGISTER message includes the IP address of the HUA 130 and the international mobile subscriber identity (IMSI) derived IP multimedia public identity (IMPU). Thereafter, in step 326, an IMS registration procedure is performed using, for example, an early IMS security registration or an NBA security registration, thereby completing the session control attach procedure in the IMS domain.

Figure 4A:
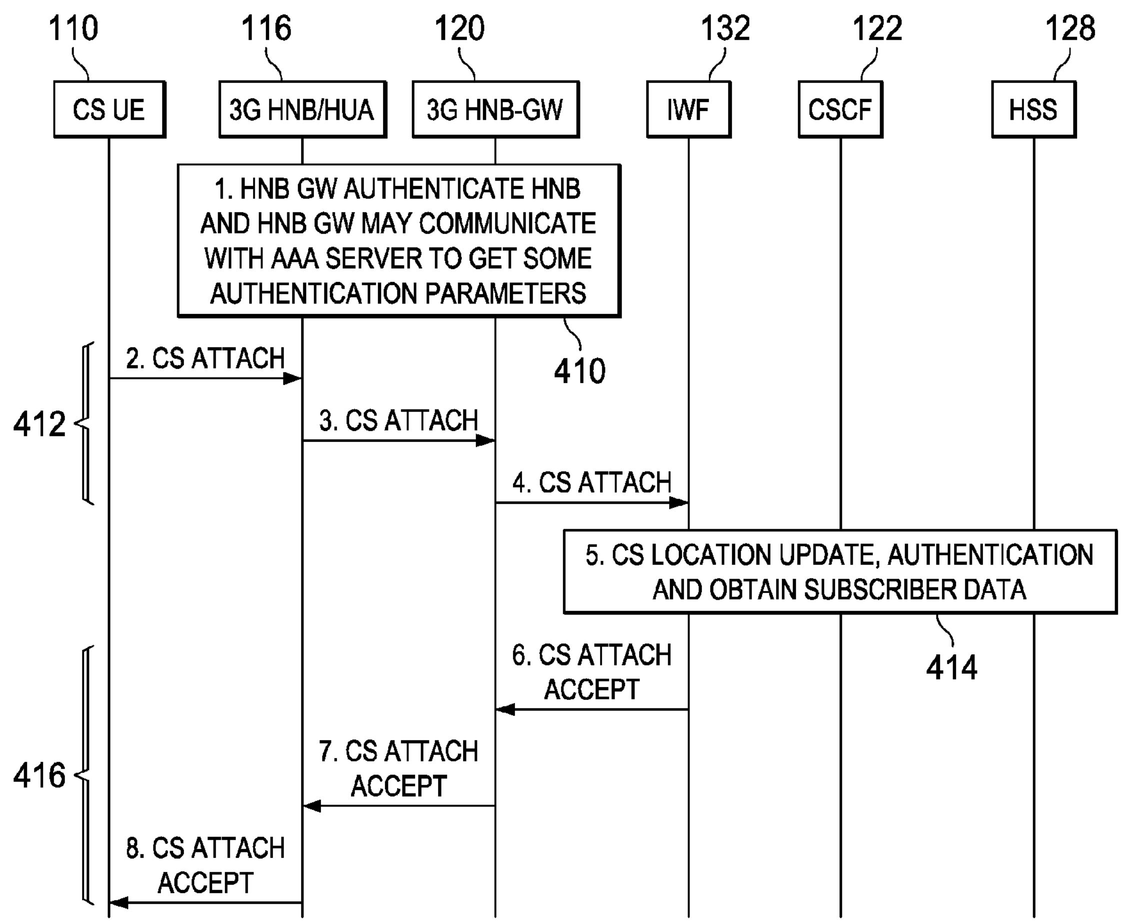
FIGS. 4*a* and 4*b* illustrate a message flow diagram for circuit switch user equipment network attachment in accordance with another embodiment of the present invention.
Figure 4B:
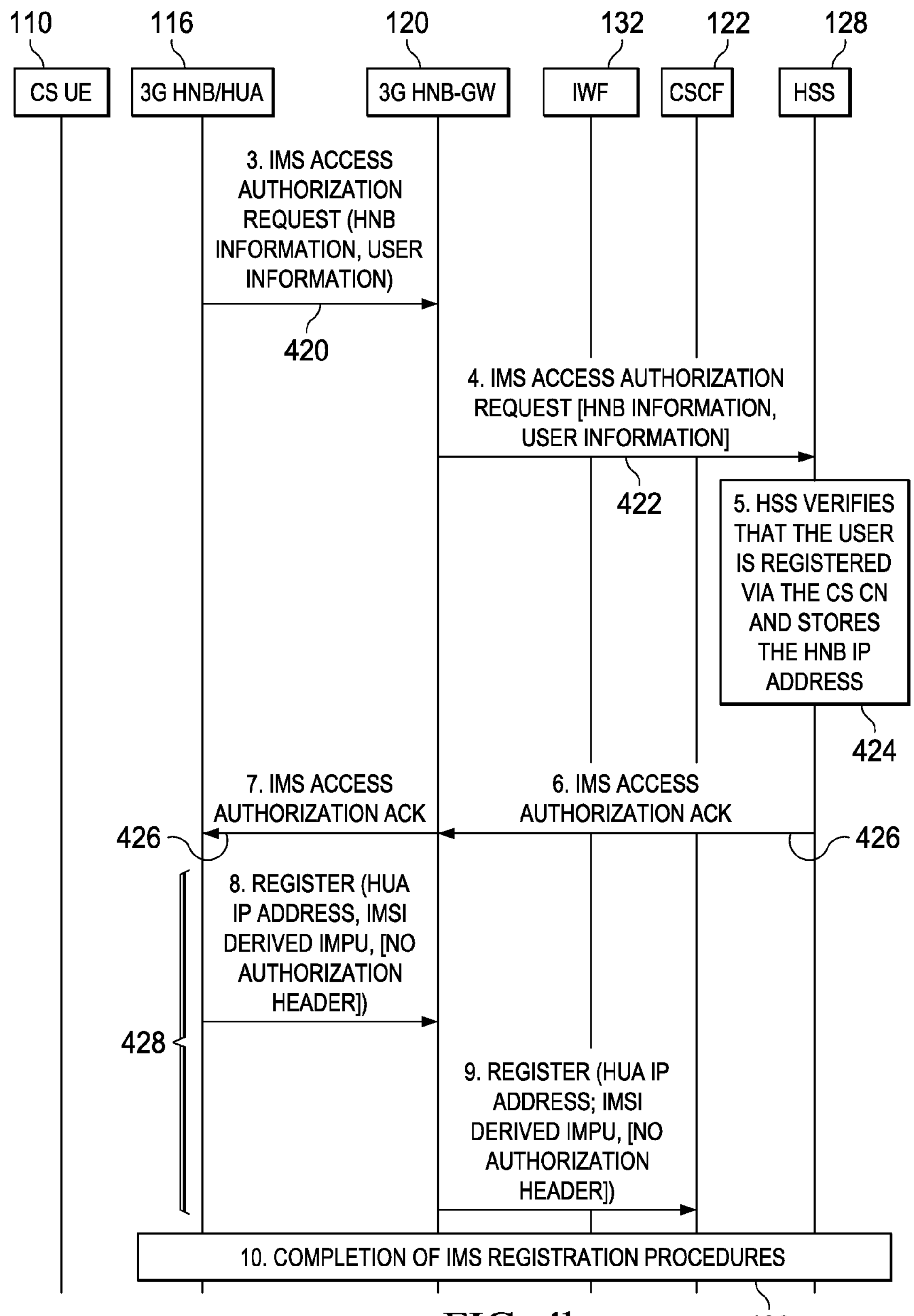

FIGS. 4*a* and 4*b* illustrate a message flow diagram that further illustrates another attach procedure with verification that may be used in accordance with another embodiment of the present invention. Steps 410-416 correspond to steps 310-316 as described above and will not be described again.

Referring now to step 420, upon successful completion of the CS attach procedure, the HNB/HUA 116 initiates an IMS access authorization procedure by, for example, transmitting an IMS ACCESS AUTHORIZATION message to the HNB GW 120. The HNB/HUA 116 provides to the HNB GW 120 as parameters information regarding the HNB/HUA 116 and the CS UE 110, such as the HNB identity information, the UE identity information (e.g., IMSI), and the like.

The HNB GW 120 validates that the received combination of the UE identity information (e.g., IMSI) and the HNB identity combination correspond to the information stored following the CS attach procedure and, in step 422, forwards the request over the HSS 128 via, for example, the Hi interface. In step 424, the HSS 128 verifies that the CS UE 110 is authorized via the CS core network. The HSS 128 may grant authorization by verifying, for example, IMS based HNB subsystem is applicable to the user, the user has been authenticated by the CS core network, and/or the CS attach procedure was performed through the HNB/HUA requesting the IMS Access Authorization. The specific method used by the HSS 128 to grant authorization may be dependent upon network operator policy. The HSS 128 may also store the network address (e.g., IP address) of the HNB/HUA 116 as well. The HSS 128 transmits an Access Authorization Acknowledgement in step 426.

In step 428, after receiving an indication that the CS UE 110 is authorized, the HNB/HUA 116 initiates an IMS registration procedure by transmitting, e.g., an IMS REGISTER message including HUA network address as the contact address and IMSI derived IMPU to the HNB GW 120, which forwards the IMS REGISTER message to the CSCF 122. In an embodiment, the HNB GW 120 implements measures to prevent IMS SIP signalling from an HNB that has not performed a successful IMS Authorization Request procedure as described above with reference to steps 420-426. Furthermore, the HNB GW 120 implements measures to prevent source IP address spoofing. For example, an HNB/HUA 116 may prohibit transmission of an IP packet with a source IP address (or the prefix in the case of IPv6 stateless auto-configuration) that is different than the one assigned by the HNB GW 120 during the HNB provisioning procedure.

Thereafter, in step 430, an IMS registration procedure is performed using, for example, an early IMS security registration or an NBA security registration, thereby completing the session control attach procedure in the IMS domain.

As one of ordinary skill in the art will realize, the embodiments described above provide different levels of security. For example, the embodiment described above with reference to FIG. 3 simply verifies that the CS UE 110 is authorized in the CS domain, where as long as the HNB GW 120 verifies that the CS UE 110 is authorized in the CS domain, the HNB GW 120 will allow and accept communications from the CS UE 110. As a result, a hacker eavesdropping on the wireless communications between the CS UE 110 and the HNB/HUA 116 would be able to utilize the user's identity, e.g., the IMSI of the CS UE 110, to program another device and connect through any HNB GW 120, including ones not necessarily associated with the CS UE 110.

On the other hand, however, the embodiment disclosed in FIGS. 4*a* and 4*b* not only verifies that the CS UE 110 is authorized, but also that the HNB/HUA 116 is associated with the CS UE 110. Accordingly, this embodiment only allows the CS UE 110 to attach through the HNB that was used for the CS Attach procedure and hence is authorized via the CS network, thereby providing a higher level of security.

Figure 5:
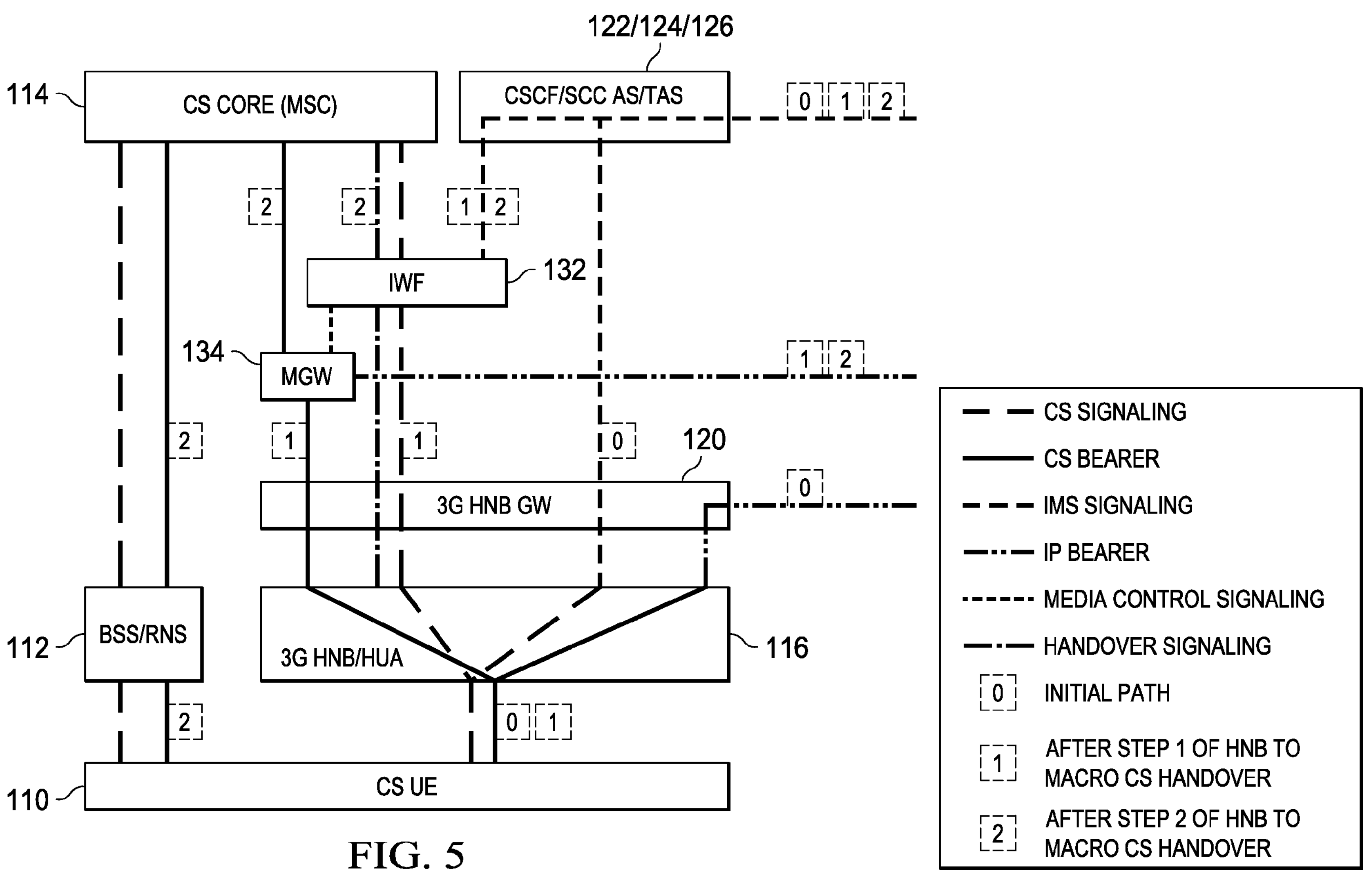
FIG. 5 illustrates a functional architecture diagram for handover with service continuity from the PS domain to the CS domain in accordance with an embodiment of the present invention.

FIG. 5 illustrates a handover from the PS domain to the CS domain with service continuity in accordance with an embodiment of the present invention. It should be noted that FIG. 5 illustrates the signaling and bearer channels during three different time periods. First, boxes with reference numeral 0 represent the signaling and bearer channels prior to handover while the CS UE 110 is communicating via the femtocell (e.g., via the HNB/HUA 116). Next, boxes with reference numeral 1 represent the signaling and bearer channels after a first stage of handover is completed when the CS UE 110 is still communicating via the femtocell, but the bearer channel is routed to the remote end via the MGW 134 rather than directly toward the remote end via the HNB GW. Finally, boxes with reference numeral 2 represent the signaling and bearer channels after handover when the CS UE 110 communicates via the macro CS. It should also be noted that the CSCF 122, the SCC AS 124, and the application servers 126 have been collapsed to a single box for ease of illustration.

Generally, there are two procedures, which may be performed in parallel. The first procedure is for the transfer of the bearer channel from the HNB/HUA 116 in the PS domain to the CS domain. This procedure begins with the HNB/HUA 116 transmitting a session transfer request to the IWF 132, providing the session related information to the IWF 132. The IWF 132 establishes the service context for the UE as requested by the HNB/HUA 116 and initiates the Session Transfer using SR-VCC procedures as defined, for example, in 3GPP TR 23.838, v9.0.0, which is incorporated herein by reference. It should be noted that the HNB/HUA 116, the IWF 132, and the SCC AS 124 collaborate to maintain not only the service state upon Session Transfer, e.g., a held session remains to be held upon the SR-VCC Session Transfer procedure, but also to maintain service context, e.g., whether the session was initiated in the CS domain or the PS domain.

Procedures as defined in 3GPP TR 23.838, v9.0.0, which is incorporated herein by reference, may be used.

The second procedure causes the CS handover from the IWF 132 to the MSC of the CS core 114 controlling the access. The HNB/HUA 116 initiates a standard CS handover procedure toward IWF 132, which uses inter-MSC handover procedures toward the target MSC. The access leg with the source HNB/HUA 116 is released upon handover.

Figure 6:
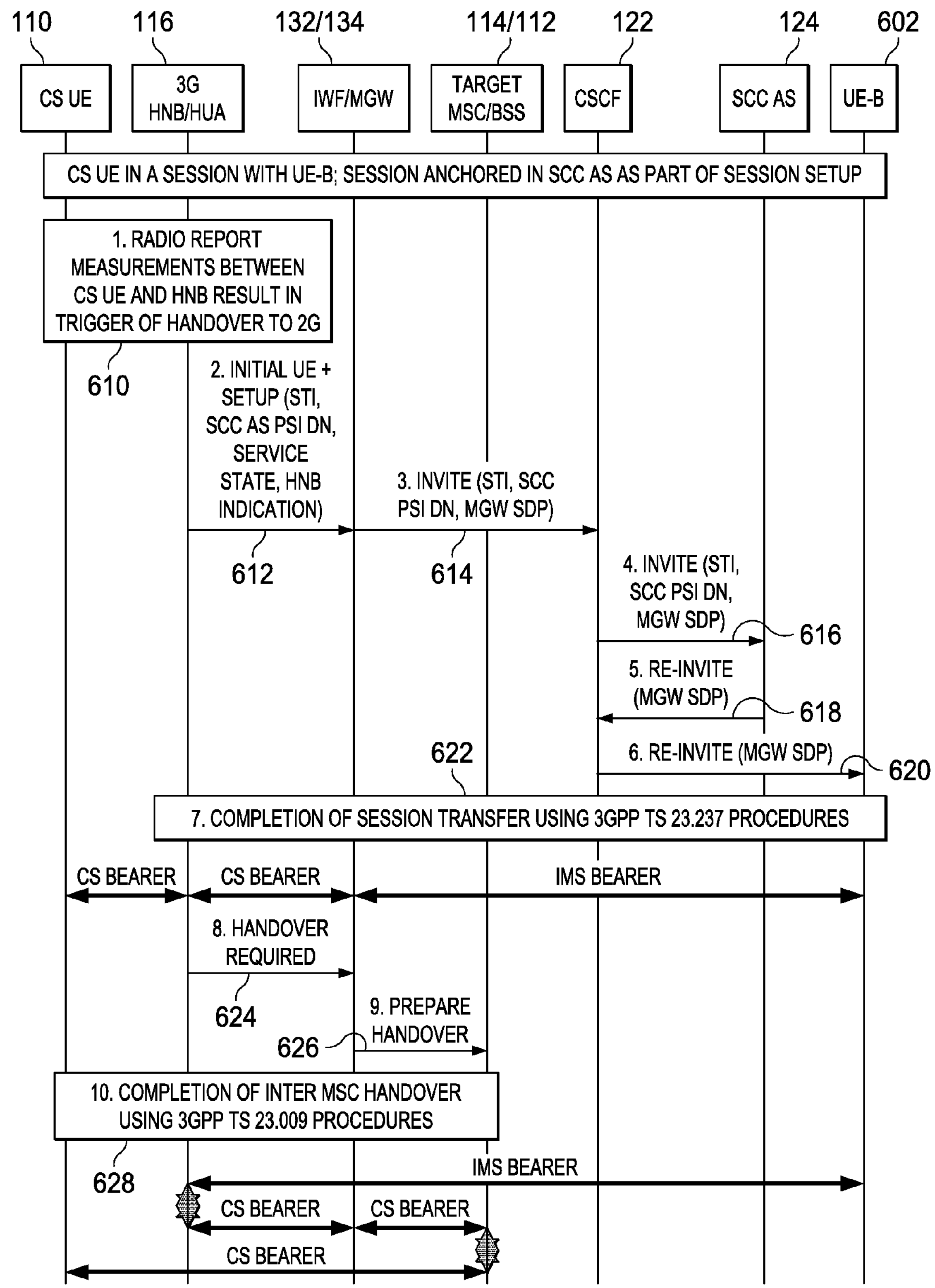
FIG. 6 is a message flow diagram for handover with service continuity from the PS domain to the CS domain in accordance with an embodiment of the present invention.

FIG. 6 is a message flow diagram illustrating messages that may be used to affect a handover as described above in accordance with an embodiment of the present invention. At an initial stage, a session is established between CS UE 110 and another party, designated as UE-B 602 in this embodiment. In step 610, radio measurements between the CS UE 110 and the HNB/HUA 116 trigger a handover procedure from the HNB/HUA 116 to the macro CS.

In step 612, the HNB/HUA 116 initiates transfer of the session by transmitting an Initial UE message and a Setup message to the IWF 132. The parameters to the Setup message include the Session Transfer ID (STI) and the SCC AS Public Service Identity (PSI) Domain Name (DN). Furthermore, the Setup message also includes the service state of the session, such as held, active, and/or the like, and a HNB Indication parameter that indicates the type of session, e.g., a CS-originated session or an IMS-originated session. As one of ordinary skill in the art will realize, the services available to the CS UE 110 may vary depending upon the type of network in which the session was originated and/or the user's subscription. As a result, the Setup message includes an HNB Indication parameter to indicate whether or not the session was an IMS-originated session. As will be discussed in greater detail below, the inclusion of the HNB Indication parameter allows continuity of the services offered and facilitates subsequent hand-back to HNB coverage.

The IWF 132 establishes a context for the CS UE 110 using the service state information and the HNB Indication provided in the Setup message, and in step 614, forwards the session transfer request to the SCC AS 124. In an embodiment such as that illustrated in FIG. 6, the SCC AS 124 transmits an INVITE message that includes the STI and SCC AS PSI DN parameters. In addition, the INVITE message may also include a MGW Session Description Protocol (SDP) parameter, which provides information related to the media port on the MGW 134. In response, the SCC AS 124 issues a Re-INVITE message to the UE-B 602 via the CSCF 122, thereby notifying the UE-B 602 of the handover and the change in routing information, as indicated in steps 618 and 620.

In step 622, the session transfer of the bearer channel from the HNB GW to the MGW is completed in accordance with, for example, procedures as specified in 3GPP TS 23.237, v9.1.0, which is incorporated herein by reference. At this point, as indicated in FIG. 6, the bearer channel extends between the CS UE 110 to the HNB/HUA 116 to the MGW 134 to the remote end. This route corresponds to the route identified by the boxes with reference numeral 1 in FIG. 5.

Thereafter, in step 624, the HNB/HUA 116 signals to the IWF 132 that a handover is required by, for example, a HANDOVER REQUIRED message. In response, the IWF 132 signals to the appropriate CS CN network element, e.g., the MSC, to prepare for a handover, providing it with the necessary information in step 626. The handover may be completed per the procedure defined within 3GPP TS 23.009, v8.1.0, which is incorporated herein by reference as indicated in step 628. Upon completion of the handover procedure, the access leg with the HNB/HUA 116 may be released.

One of ordinary skill in the art will realize that at this point the bearer channel extends from the CS UE 110 to the CS CN 114 (e.g., the MSC via the BSS/RNS 112) to the MGW 134 to the remote end.

It should be noted that the designation of CS bearer channels and IMS bearer channels in architecture diagrams such as FIG. 5 and the designation of CS bearer channels and IMS bearer channels in message flow diagrams such as FIG. 6 follow conventions known in the art. Generally, the CS bearer channels and the IMS bearer channels in the architecture diagrams illustrate the type of control plane as to whether control plane signaling is CS or IMS, respectively. It should also be noted that CS bearer may include media flows established over IP for some portions of a call leg, for the case when a MGW provides the interworking between CS and IP media flows. Thus, it is possible that on a message flow diagram a CS bearer corresponds to or includes an IP media flow on the architecture diagram.

Figure 7:
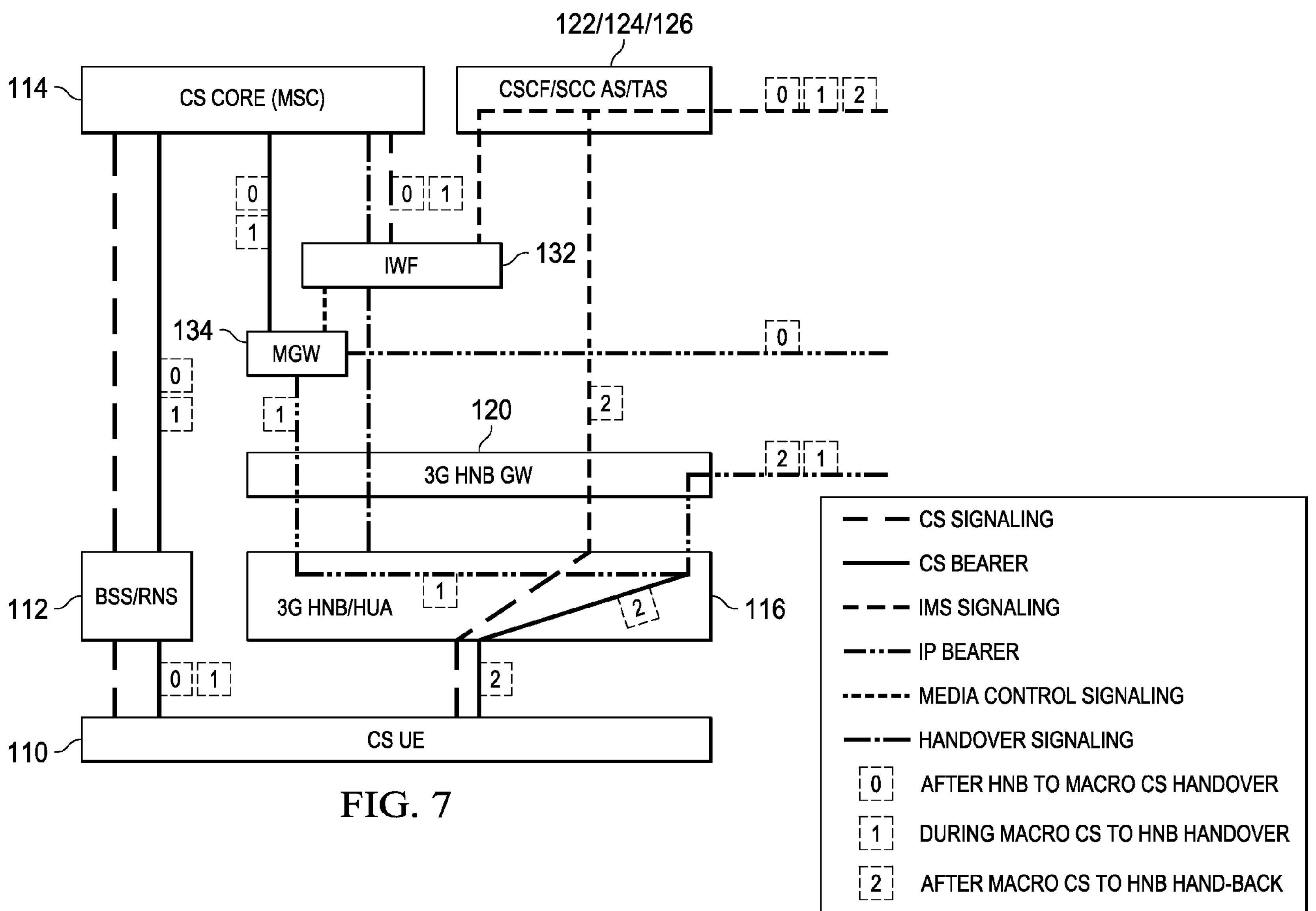
FIG. 7 illustrates a functional architecture diagram for hand-back from the CS domain to the PS domain in accordance with an embodiment of the present invention.

FIG. 7 illustrates a hand-back from the CS domain back to the PS domain such as that that may occur if after the process described above with reference to FIGS. 5 and 6 service of the UE is handed back to the PS domain, in accordance with an embodiment of the present invention. Similar to the handover from the PS domain to the CS domain, the hand-back process includes two steps. The first step of the hand-back procedure performs a hand-back from the MSC in the CS Core 114 to the IWF 132, which acts as the MSC for the PS domain. The CS hand-back from MSC to IWF 132 may be performed using standard inter-MSC handover procedures. The IWF 132 initiates a relocation resource allocation procedure toward HNB, providing the STI and other session transfer information such as the current service state, an indication that the session was initially established by an HNB, and/or the like. In this manner, the service state and HNB indication is transferred from the IWF 132 to the target HNB/HUA 116. Upon receipt, the HNB/HUA 116 performs radio resource allocation and bearer setup toward IWF 132. It should be noted that the target HNB/HUA may be a different HNB/HUA than the HNB/HUA used prior to handover from the HNB/HUA to the CS domain.

The second step of the hand-back procedure performs a CS-to-PS session transfer procedure for the setup of the PS bearer channel. The HNB/HUA 116 initiates a session transfer procedure via the HGm interface. The HNB/HUA 116 establishes a context for the UE using the service state information provided by the HNB/HUA 116 in the first step. The service state information allows the HNB/HUA 116 to establish the transfer leg in the held state if the session was in the held state at the time of handover (hand-back). A downlink bearer path between the remote end and the target access is established at the HNB/HUA 116 as a result of this procedure.

During the hand-back procedure, a bi-cast bearer path is established for downlink, with one bearer path extending from the remote end to the HNB/HUA 116 to the MGW 134 to the CS Core (MSC) 114 to the BSS/RNS 112 to the CS UE 110 and another bearer path extending from the remote end to the HNB/HUA 116 to the CS UE 110. After the hand-back is complete, the bearer path is from the remote end to the HNB/HUA 116 to the CS UE 110, and the signaling and bearer channel with the IWF 132 and the CS Core (MSC) 114 is released. This sequence of paths is illustrated by the boxes with the reference numerals in FIG. 7, wherein boxes with reference numeral 0 represent the signaling and bearer channels prior to hand-back, boxes with reference numeral 1 represent the signaling and bearer channels after a first stage of hand-back is completed when dual bearer channels are established, and boxes with reference numeral 2 represent the signaling and bearer channels after hand-back is completed.

As illustrated in FIG. 7, prior to hand-back, the bearer channel was anchored in the MGW 134, but after hand-back, the bearer channel is anchored in the HNB GW 120. The use of a bi-cast downlink bearer path allows for a smoother transition during hand-back with less or no clipping in the service. A single uplink bearer channel anchored in the MGW 134 is utilized, wherein an uplink communication after the downlink bi-cast bearer channels are established triggers the switch over to the final bearer channel path illustrated in FIG. 7.

Figure 8:
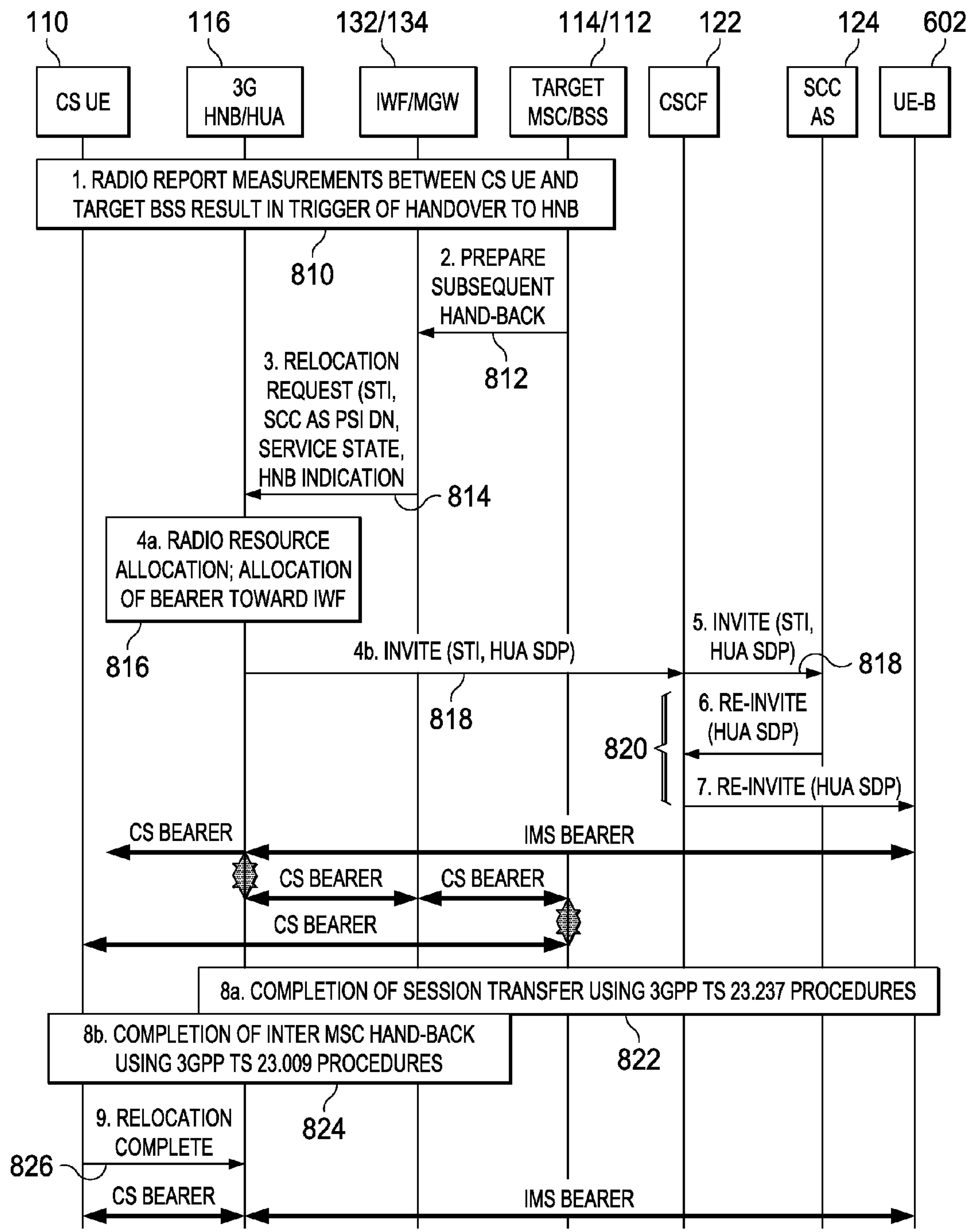
FIG. 8 is a message flow diagram for hand-back from the CS domain to the PS domain in accordance with an embodiment of the present invention.

FIG. 8 is a message flow diagram illustrating messages that may be used to affect a hand-back procedure such as that described above with reference to FIG. 7 in accordance with an embodiment of the present invention. At an initial stage, a session is established between CS UE 110 and another party, designated as UE-B 602 in this embodiment. In step 810, radio measurements between the CS UE 110 and the BSS 112/CS Core (MSC) 114 trigger a hand-back from the macro CS to the HNB/HUA 116.

In step 812, the CS Core (MSC) 114 transmits a message to the IWF 132 indicating that the IWF 132 is to prepare for a hand-back. In response, the IWF 132 transmits a RELOCATION REQUEST message to the HNB/HUA 116 in step 814. The parameters of the RELOCATION REQUEST message include the Session Transfer ID (STI), the SCC AS Public Service Identity (PSI) Domain Name (DN), service state information of the session, and an HNB Indication parameter that indicates the type of session, e.g., a CS-originated session or an IMS-originated session.

Upon receipt, in step 816, the HNB/HUA 116 allocates the necessary resources for the impending hand-back, including allocation of the radio resources for communications with the CS UE 110 as well as allocation of a bearer channel toward the IWF 132 and the MGW 134. In step 818, the HNB/HUA 116 transmits an INVITE message that includes the STI and a HUA SDP as parameters to the CSCF 122. The HUA SDP specifies information necessary for a media flow to be established with the HUA SIP client on the HNB/HUA 116. The INVITE message is forwarded to the SCC AS 124.

In step 820, the SCC AS 124 issues a Re-INVITE message to the UE-B 602 via the CSCF 122. As a result of this process, a bearer channel is established from the UE-B 602 to the HNB/HUA 116 to the MGW 134 to the CS Core (MSC) 114 to the BSS 112 to the CS UE 110. It should be noted that at this point the bearer channel flows through the HNB/HUA 116, but the HNB/HUA 116 does not couple the bearer channel directly to the CS UE 110. This is indicated in FIG. 8 by the partial bearer channel between the HNB/HUA 116 and the CS UE 110.

Next, in step 822, the session transfer is completed using, for example, procedures defined in 3GPP TS 23.237, v9.1.0, which is incorporated herein by reference, and in step 824, the inter-MSC hand-back procedure is completed using, for example, procedures defined in 3GPP TS 23.009, v8.1.0, which is incorporated herein by reference. To complete the process, the CS UE 110 may transmit a RELOCATION COMPLETE message to indicate that the hand-back procedure is complete. As illustrated in FIG. 8, the bearer channel now exists from the CS UE 110 to the HNB/HUA 116 to the UE-B 602.

Figure 9:
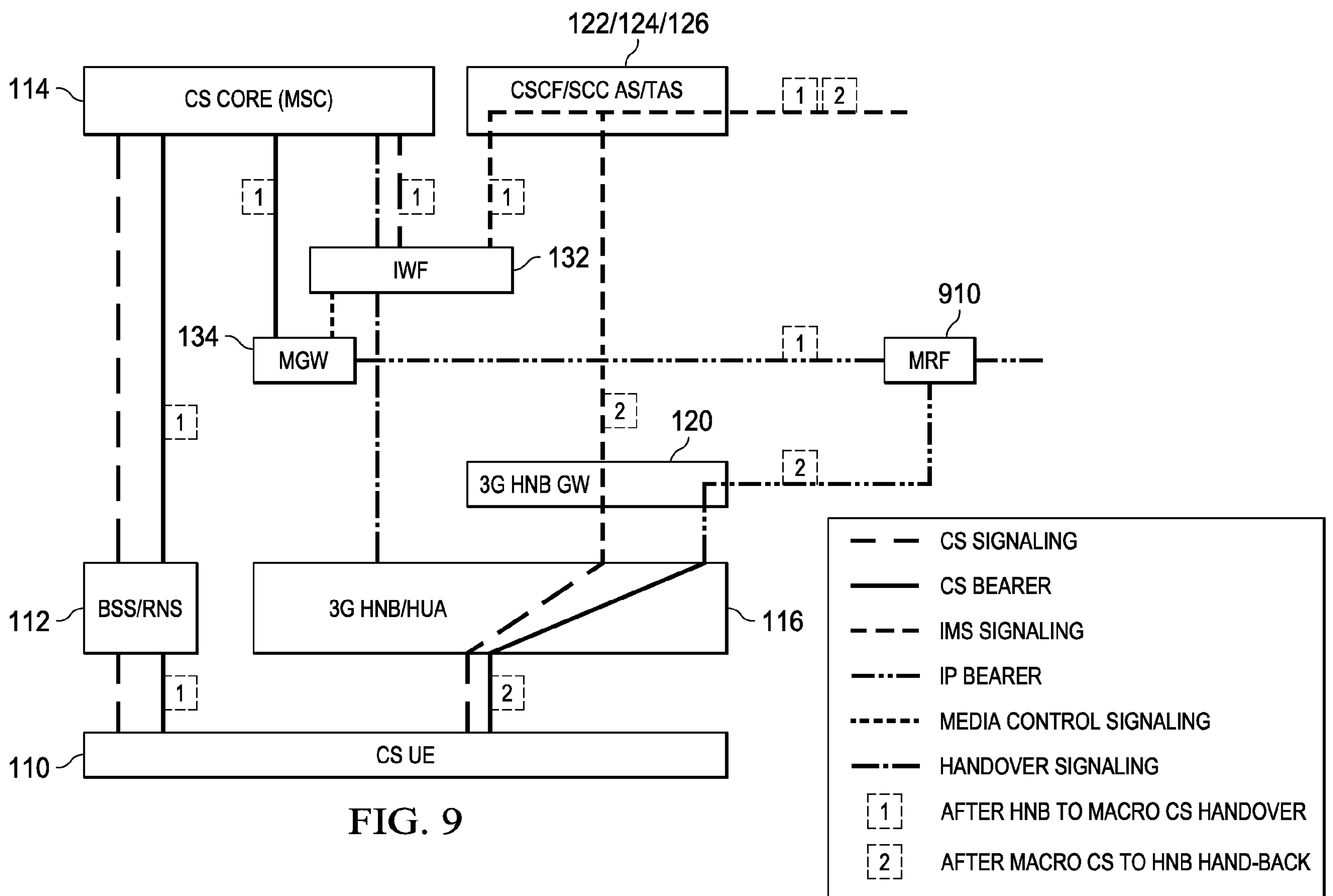
FIG. 9 illustrates a functional architecture diagram for hand-back from the CS domain to the PS domain in accordance with another embodiment of the present invention.

FIG. 9 illustrates another method of performing a hand-back from the CS domain back to the PS domain such as that that may occur if after the process described above with reference to FIGS. 5 and 6 service of the UE is handed back to the PS domain, in accordance with an embodiment of the present invention. It should be appreciated that the hand-back process described above with reference to FIGS. 7 and 8 is handled by the MGW 134. The process discussed below with reference to FIGS. 9 and 10, however, control the hand-back process by the SCC AS 124.

The method illustrated in FIG. 9 is similar to that illustrated in FIG. 7, except that the bi-cast downlink channel is anchored in a Multimedia Resource Function (MRF) 910 in the embodiment illustrated in FIG. 9 rather than being anchored in the HNB/HUA 116 as illustrated in FIG. 7. In this embodiment, the SCC AS 124 employs a downlink bi-cast toward the target access leg via the MRF 910 upon receipt of a SESSION TRANSFER request and subsequently establishes bi-directional link between the remote leg via the MRF 910 with the target access leg upon detection of the first uplink packet from the target Access Leg.

Figure 10:
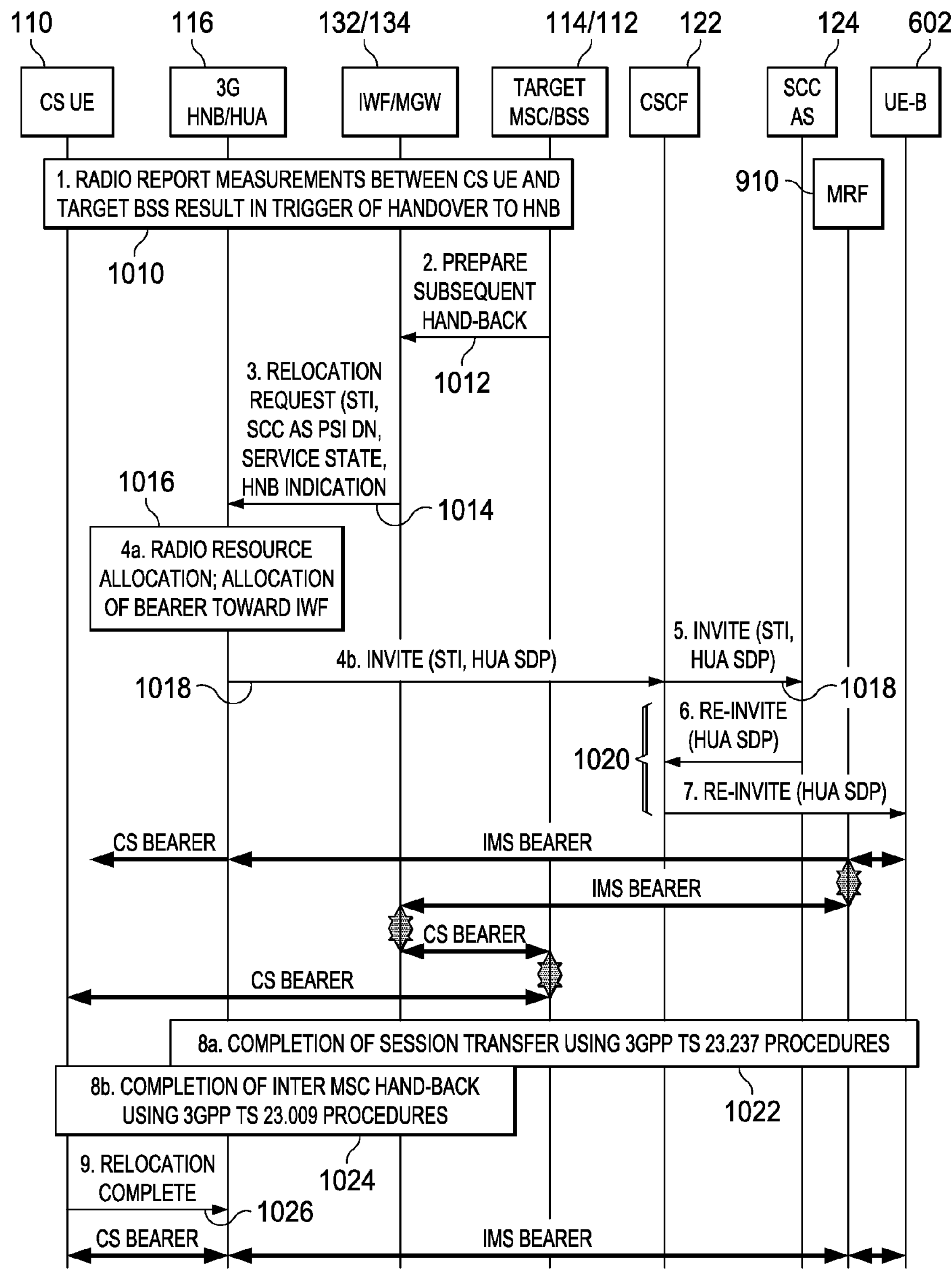
FIG. 10 is a message flow diagram for hand-back from the CS domain to the PS domain in accordance with another embodiment of the present invention.

FIG. 10 is a message flow diagram illustrating messages that may be used to affect a hand-back procedure such as that described above with reference to FIG. 9 in accordance with an embodiment of the present invention. Steps 1010-1020 of FIG. 10 are similar to steps 810-820 of FIG. 8, except that the SCC AS 124 issues a Re-INVITE message that causes a bi-cast bearer channel to be established at the MRF 910. As illustrated in FIG. 10, UE-B 602 has a bearer channel to the MRF 910, and the MRF has two bearer channels directed toward the CS UE 110. A first bearer channel is established from the MRF 910 to the HNB/HUA 116, and a second bearer channel is established from the MRF 910 to the MGW 134 to the CS Core (MSC) 114 to the BSS 112 to the CS UE 110. At this point, the HNB/HUA 116 does not complete the connection with the CS UE 110.

Steps 1022-1026 of FIG. 10 perform similar functions as steps 822-826 of FIG. 8. As a result of this process, the bearer channel between the HNB/HUA 116 and the CS UE 110 is completed and the bearer channel via the MGW 134 is released.

Figure 11:
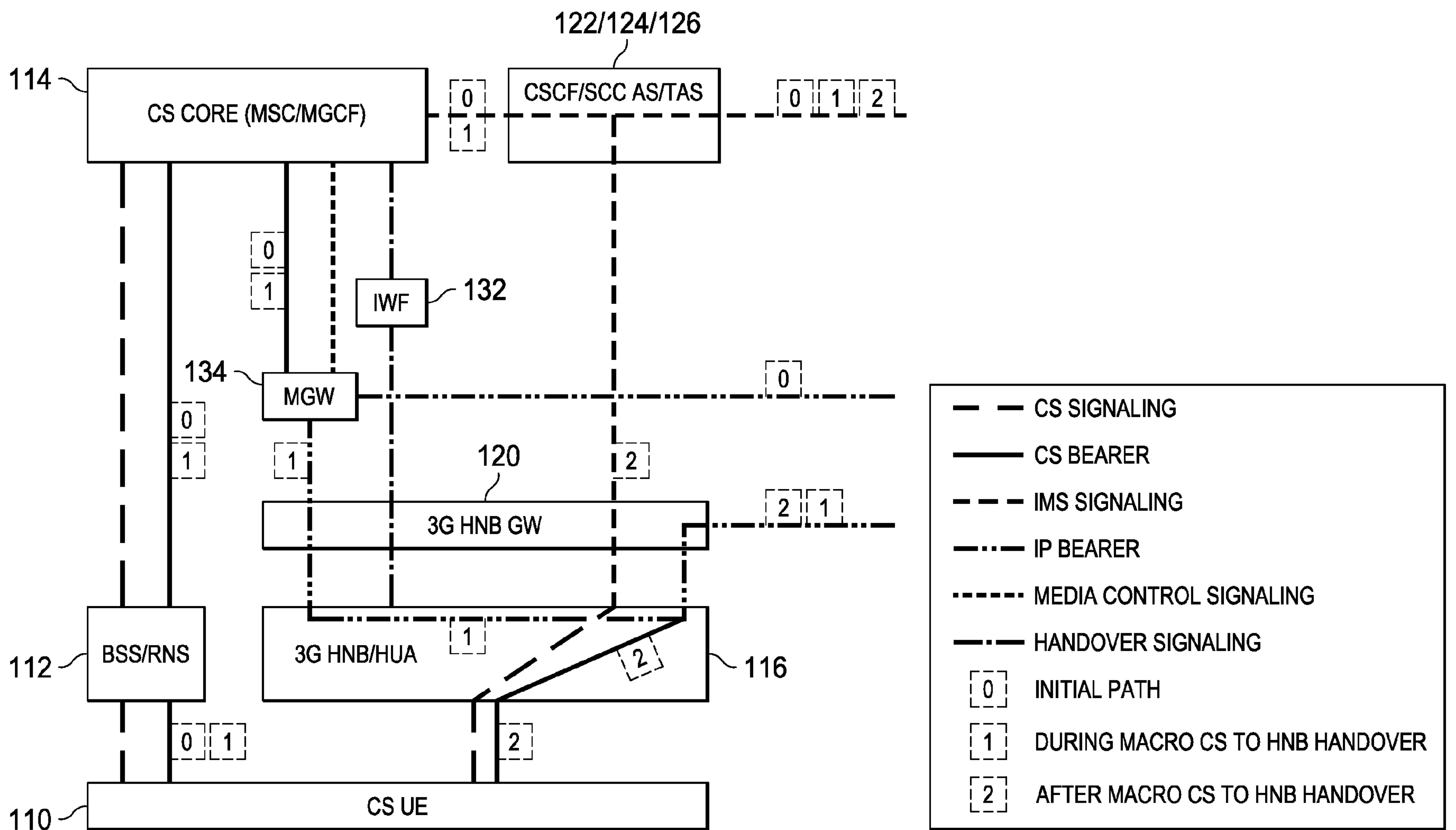
FIG. 11 illustrates a functional architecture diagram for hand-in from the CS domain to the PS domain in accordance with an embodiment of the present invention.

FIG. 11 illustrates a hand-in from the CS domain to the PS domain in accordance with an embodiment of the present invention. While the discussion above relates to handover and hand-back procedures, the process discussed with reference to FIG. 11 is a hand-in procedure wherein a session is initiated in the CS domain and handover (or hand-in) to the PS domain is to be performed.

Similar to the hand-back from the CS domain to the PS domain, the hand-in process from the CS domain to the PS domain includes two steps. The first step of the hand-in procedure performs a hand-in from the MSC in the CS Core 114 to the IWF 132, which acts as the MSC for the PS domain. The CS hand-in from MSC to IWF 132 may be performed using standard inter-MSC handover procedures. The IWF 132 initiates a relocation resource allocation procedure toward HNB, but in this case the IWF 132 does not have the STI or other session transfer information to pass to the HNB. An indication that the session was not initially established by an HNB, however, is provided by the IWF 132. Upon receipt, the HNB/HUA 116 performs radio resource allocation and bearer setup toward IWF 132.

The second step of the hand-in procedure performs a CS-to-PS session transfer procedure for the setup of the PS bearer channel. The HNB/HUA 116 initiates a session transfer procedure via the HGm interface. The HNB/HUA 116 establishes a context for the UE in the basic service state using STI information. In an embodiment, the STI information is static STI information that is pre-provisioned to identify the session that needs to be transferred, see, e.g., 3GPP TS 23.237, v9.1.0, which is incorporated herein by reference. A downlink bearer path between the remote end and the target access is established at the HNB/HUA 116 as a result of this procedure.

During the hand-in procedure, a bi-cast bearer path is established for downlink, with one bearer path extending from the remote end to the HNB/HUA 116 to the MGW 134 to the CS Core (MSC) 114 to the BSS/RNS 112 to the CS UE 110 and another bearer path extending from the remote end to the HNB/HUA 116 to the CS UE 110. After the hand-in is complete, the bearer path is from the remote end to the HNB/HUA 116 to the CS UE 110, and the signaling and bearer channel with the IWF 132 and the CS Core (MSC) 114 is released. This sequence of paths is illustrated by the boxes with the reference numerals in FIG. 11, wherein boxes with reference numeral 0 represent the signaling and bearer channels prior to hand-in, boxes with reference numeral 1 represent the signaling and bearer channels after a first stage of hand-in is completed when bi-cast bearer channels are established, and boxes with reference numeral 2 represent the signaling and bearer channels after hand-in is completed. As illustrated in FIG. 11, prior to hand-in, the bearer channel was anchored in the MGW 134, but after hand-in, the bearer channel is anchored in the HNB GW 120, thereby removing the MGW 134 from the bearer path.

Figure 12:
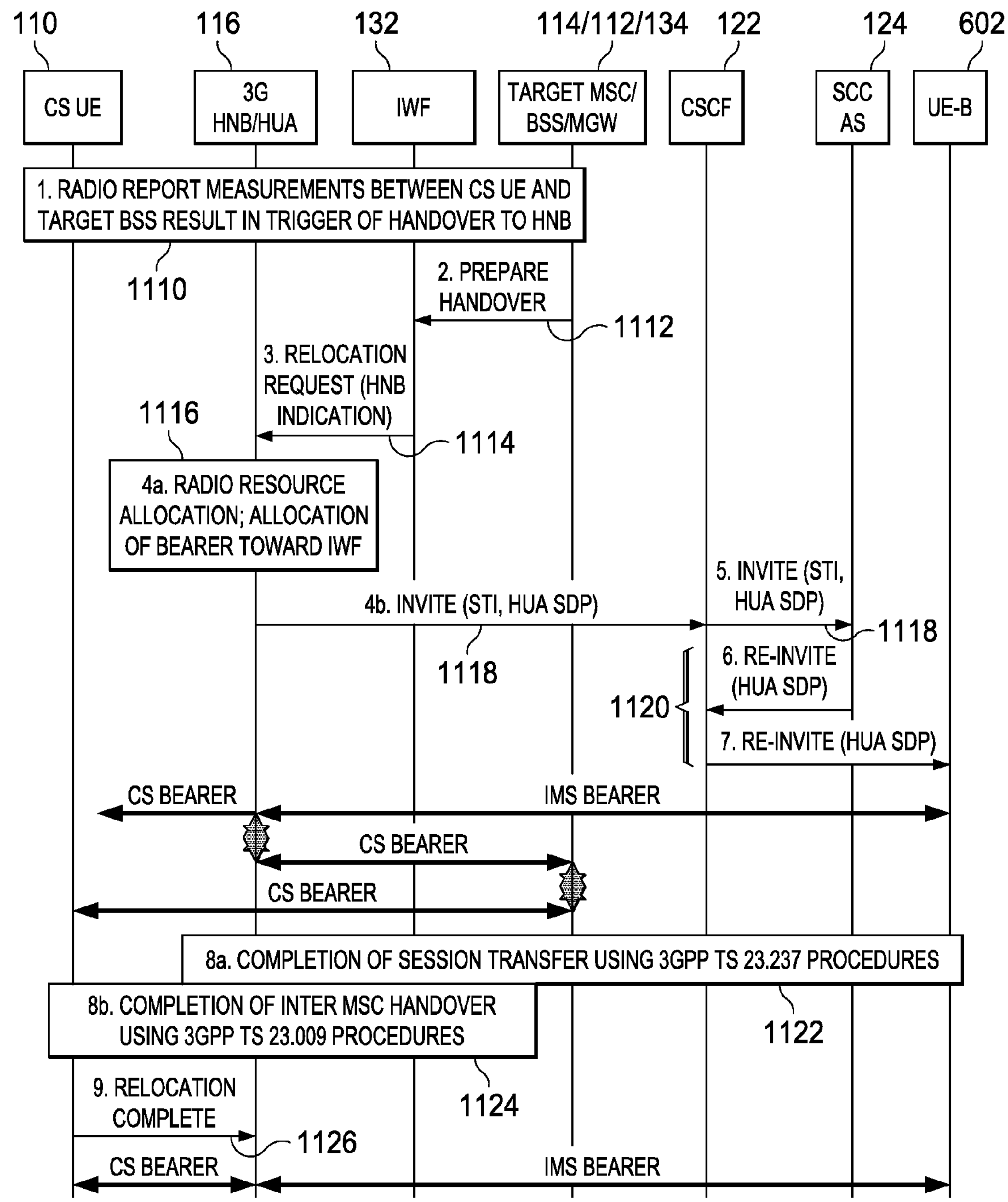
FIG. 12 is a message flow diagram for hand-in from the CS domain to the PS domain in accordance with an embodiment of the present invention.

FIG. 12 is a message flow diagram illustrating messages that may be used to affect a hand-in procedure such as that described above with reference to FIG. 11 in accordance with an embodiment of the present invention. At an initial stage, a session is established between CS UE 110 and another party, designated as UE-B 602 in this embodiment. In step 1110, radio measurements between the CS UE 110 and the BSS 112/CS Core (MSC) 114 trigger a hand-in from the macro CS to the HNB/HUA 116.

In step 1112, the CS Core (MSC) 114 transmits a message to the IWF 132 indicating that the IWF 132 is to prepare for a hand-in. In response, the IWF 132 transmits a RELOCATION REQUEST message to the HNB/HUA 116 in step 1114. The parameters to the RELOCATION REQUEST message a HNB Indication parameter that indicates the type of session, e.g., a CS-originated session in this case.

Upon receipt, the HNB/HUA 116 allocates the necessary resources for the impending hand-in, including allocation of the radio resources for communications with the CS UE 110 as well as allocation of a bearer channel toward the IWF 132 and the MGW 134 as shown in step 1116. In step 1118, the HNB/HUA 116 transmits an INVITE message that includes the STI and a HUA SDP as parameters to the CSCF 122. The HUA SDP specifies information necessary for a media flow to be established with the HUA SIP client on the HNB/HUA 116. The INVITE message is forwarded to the SCC AS 124.

The SCC AS 124 issues a Re-INVITE message to the UE-B 602 via the CSCF 122 in step 1120. As a result of this process, a bearer channel is established from the UE-B 602 to the HNB/HUA 116 to the MGW 134 to the CS Core (MSC) 114 to the BSS 112 to the CS UE 110. It should be noted that at this point the bearer channel flows through the HNB/HUA 116, but the HNB/HUA 116 does not couple the bearer channel directly to the CS UE 110. This is indicated in FIG. 12 by the partial bearer channel between the HNB/HUA 116 and the CS UE 110.

Next, in step 1122, the session transfer is completed using, for example, procedures defined in 3GPP TS 23.237, v9.1.0, which is incorporated herein by reference, and in step 1124, the inter-MSC hand-in procedure is completed using, for example, procedures defined in 3GPP TS 23.009, v8.1.0, which is incorporated herein by reference. To complete the process, the CS UE 110 may transmit a RELOCATION COMPLETE message to indicate that the hand-in procedure is complete in step 1126. As illustrated in FIG. 11, the bearer channel now exists from the CS UE 110 to the HNB/HUA 116 to the UE-B 602, with the MGW 134 being removed from the bearer path.

Figure 13:
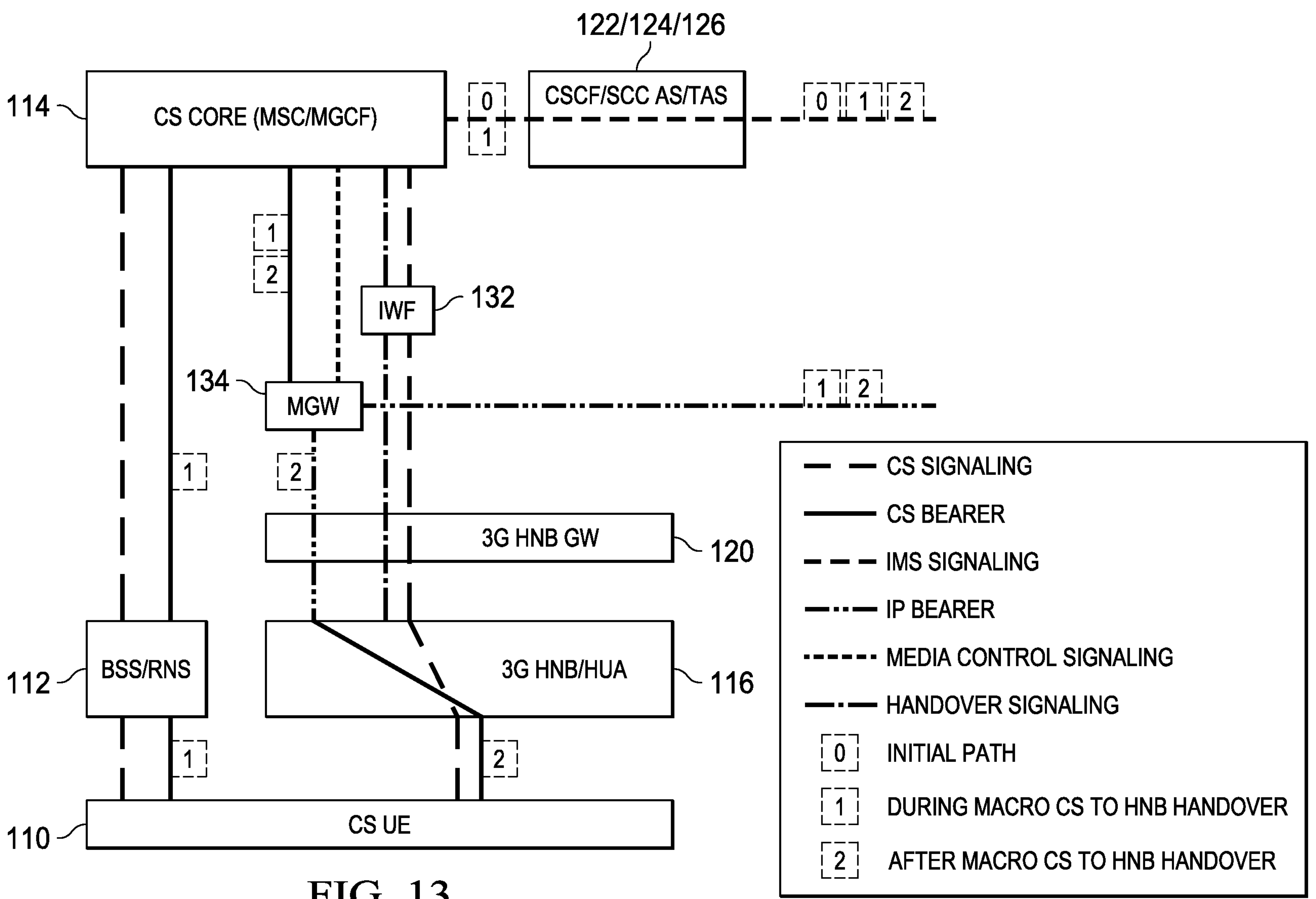
FIG. 13 illustrates a functional architecture diagram for hand-in from the CS domain to the PS domain in accordance with another embodiment of the present invention.

FIG. 13 illustrates another hand-in procedure from the CS domain to the PS domain in accordance with another embodiment of the present invention. As will be discussed in greater detail below, the hand-in procedures discussed above with reference to FIGS. 11 and 12 removed the MGW 134 from the bearer path after the hand-in procedure was completed. In the hand-in procedure illustrated with reference to FIGS. 13 and 14, however, the MGW 134 remains in the bearer path after the hand-in is completed.

Accordingly, the hand-in procedure performs a hand-in from the MSC in the CS Core 114 to the IWF 132, which acts as the MSC for the PS domain. The CS hand-in from MSC to IWF 132 may be performed using standard inter-MSC handover procedures. The IWF 132 initiates a relocation resource allocation procedure toward HNB, but in this case the IWF 132 does not have the STI or other session transfer information to pass to the HNB. An indication that the session was not initially established by an HNB, however, is provided by the IWF 132. Upon receipt, the HNB/HUA 116 performs radio resource allocation and bearer setup toward IWF 132.

At this point, a bi-cast bearer path is established for downlink, with one bearer path extending from the remote end to the MGW 134 to the CS Core (MSC) 114 to the BSS/RNS 112 to the CS UE 110 and another bearer path extending from the remote end to the MGW 134 to the HNB/HUA 116 to the CS UE 110. After the hand-in is complete, the bearer path is from the remote end to MGW 134 to the HNB/HUA 116 to the CS UE 110, and the signaling and bearer channel from the MGW 134 to the CS Core (MSC) 114 to the BSS/RNS 112 to the CS UE 110 are released. This sequence of paths is illustrated by the boxes with the reference numerals in FIG. 13, wherein boxes with reference numeral 0 represent the signaling and bearer channels prior to hand-in, boxes with reference numeral 1 represent the signaling and bearer channels after a first stage of hand-in is completed when bi-cast bearer channels are established, and boxes with reference numeral 2 represent the signaling and bearer channels after hand-in is completed. As illustrated in FIG. 13, the MGW 134 remains in the bearer path after hand-in is completed.

Figure 14:
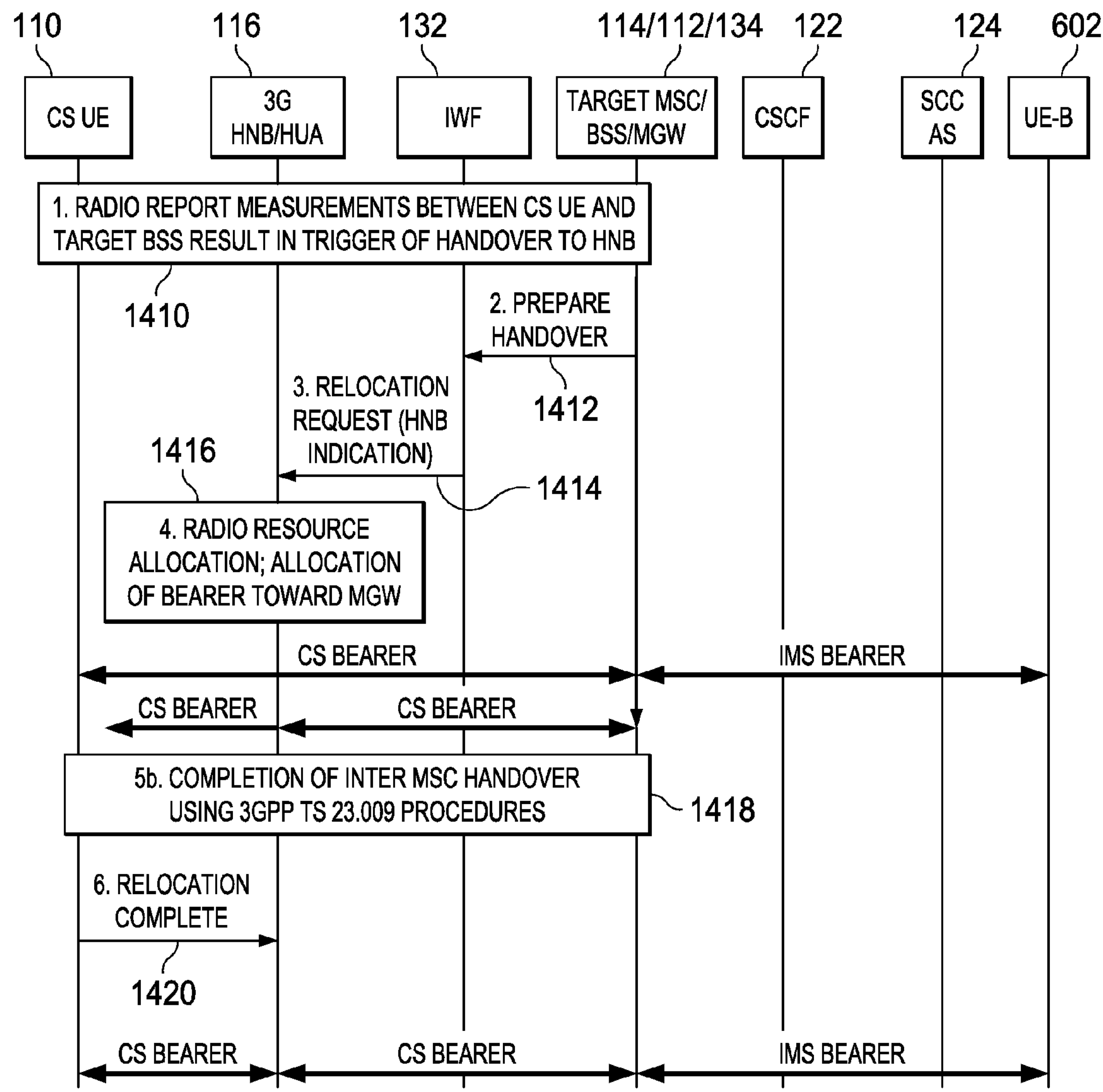
FIG. 14 is a message flow diagram for hand-in from the CS domain to the PS domain in accordance with another embodiment of the present invention.

FIG. 14 is a message flow diagram illustrating messages that may be used to affect a hand-in procedure such as that described above with reference to FIG. 13 in accordance with an embodiment of the present invention. At an initial stage, a session is established between CS UE 110 and another party, designated as UE-B 602 in this embodiment. In step 1410, radio measurements between the CS UE 110 and the BSS 112/CS Core (MSC) 114 trigger a hand-in from the macro CS to the HNB/HUA 116.

In step 1412, the CS Core (MSC) 114 transmits a message to the IWF 132 indicating that the IWF 132 is to prepare for a hand-in. In response, the IWF 132 transmits a RELOCATION REQUEST message to the HNB/HUA 116 in step 1414. The parameters of the RELOCATION REQUEST message an HNB Indication parameter that indicates the type of session, e.g., a CS-originated session in this case.

Upon receipt, in step 1416, the HNB/HUA 116 allocates the necessary resources for the impending hand-in, including allocation of the radio resources for communications with the CS UE 110 as well as allocation of a bearer channel toward the IWF 132 and the MGW 134. One skilled in the art will appreciate that the INVITE/Re-INVITE messages discussed above with reference to FIG. 12 are not used in this embodiment. As a result, the bi-cast bearer channels are anchored in the MGW 134 as illustrated in FIG. 14, rather than being anchored in the HNB/HUA 116 as illustrated in FIG. 12. In particular, a bearer channel is established from the UE-B 602 to the MGW 134 to the CS Core (MSC) 114 to the BSS 112 to the CS UE 110, with a bi-cast bearer channel established between the MGW 134 and the HNB/HUA 116. It should be noted that at this point the bearer channel flows to the HNB/HUA 116, but the HNB/HUA 116 does not couple the bearer channel directly to the CS UE 110. This is indicated in FIG. 14 by the partial bearer channel between the HNB/HUA 116 and the CS UE 110.

Next, in step 1418, the inter-MSC hand-in procedure is completed using, for example, procedures defined in 3GPP TS 23.009, v8.1.0, which is incorporated herein by reference. To complete the process, the CS UE 110 may transmit a RELOCATION COMPLETE message to indicate that the hand-in procedure is complete in step 1420. As illustrated in FIG. 14, the bearer channel now exists from the CS UE 110 to the HNB/HUA 116 to the MGW 134 to the UE-B 602, with the MGW 134 remaining in the bearer path.

Figure 15:
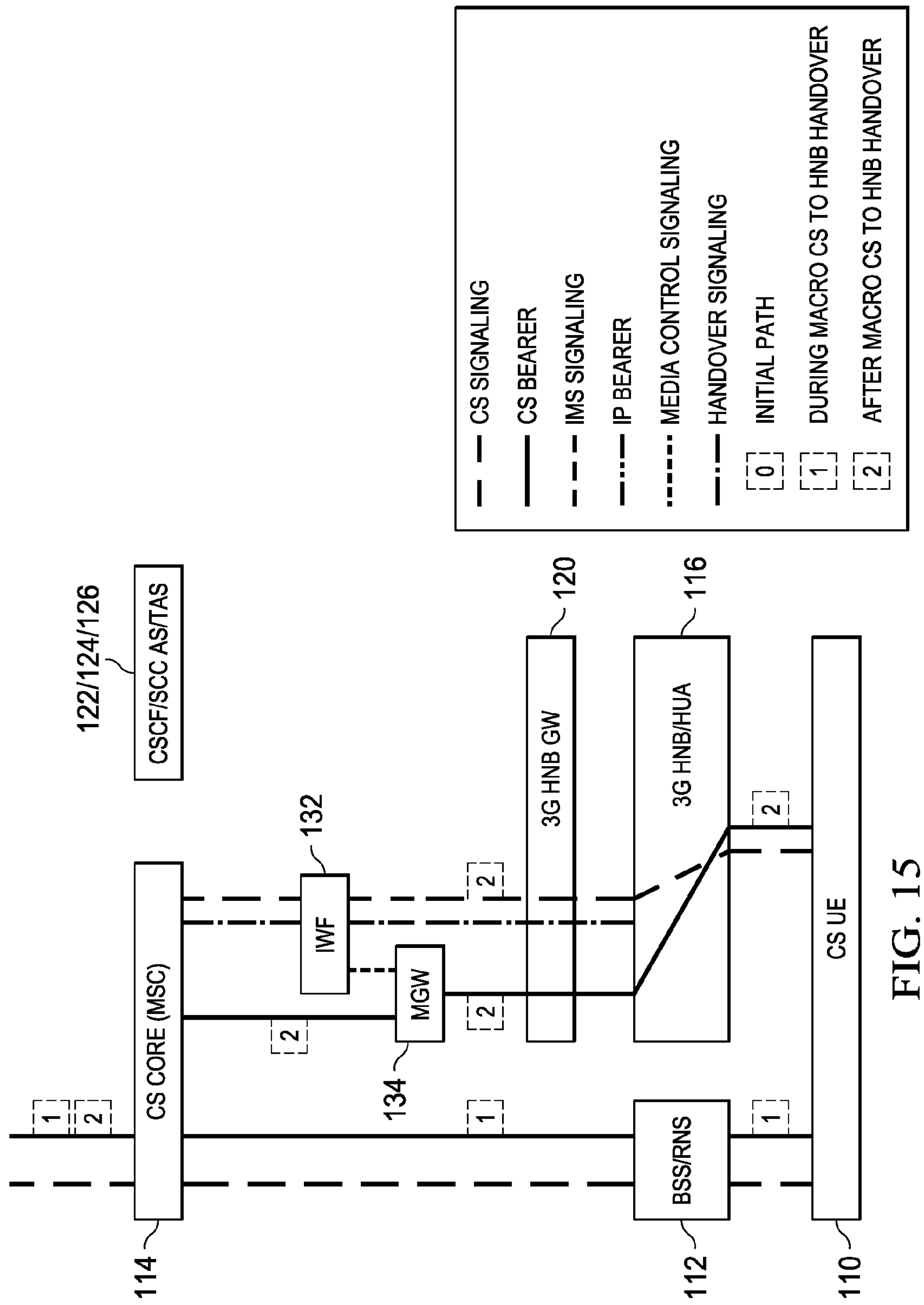
FIG. 15 illustrates a functional architecture diagram for hand-in from the CS domain to the PS domain in accordance with yet another embodiment of the present invention.

FIG. 15 illustrates another hand-in procedure from the CS domain to the PS domain in accordance with another embodiment of the present invention. It should be noted, however, that the hand-in procedures discussed above with reference to FIGS. 11-14 discussed the situation in which IMS services were enabled, thereby allowing the PS network to be utilized. The embodiment illustrated in FIG. 15, on the other hand, illustrates a hand-in procedure that may be utilized when the PS network is not to be utilized. This embodiment allows the femtocell HNB/HUA 116 to be utilized as an access point, but the traffic remains CS and is routed to the MGW 134 and the CS Core (MSC) 114 rather than being routed to the IMS network.

Accordingly, the hand-in procedure performs a hand-in from the MSC in the CS Core 114 to the IWF 132. The CS hand-in from MSC to IWF 132 may be performed using standard inter-MSC handover procedures. The IWF 132 initiates a relocation resource allocation procedure toward HNB/HUA 116 without providing the STI or other session transfer information to pass to the HNB. An indication that the session was not initially established by an HNB, however, is provided by the IWF 132. Upon receipt, the HNB/HUA 116 performs radio resource allocation and bearer setup toward IWF 132.

At this point, a bi-cast bearer path is established for downlink, with one bearer path extending from the remote end to the MGW 134 to the CS Core (MSC) 114 to the BSS/RNS 112 to the CS UE 110 and another bearer path extending from the remote end to the MGW 134 to the HNB/HUA 116 to the CS UE 110. After the hand-in is complete, the bearer path is from the remote end to MGW 134 to the HNB/HUA 116 to the CS UE 110, and the signaling and bearer channel with from the CS Core (MSC) 114 to the BSS/RNS 112 to the CS UE 110 is released. This sequence of paths is illustrated by the boxes with the reference numerals in FIG. 15, wherein boxes with reference numeral 0 represent the signaling and bearer channels prior to hand-in, boxes with reference numeral 1 represent the signaling and bearer channels after a first stage of hand-in is completed when bi-cast bearer channels are established, and boxes with reference numeral 2 represent the signaling and bearer channels after hand-in is completed. As illustrated in FIG. 15, the MGW 134 remains in the bearer path after hand-in is completed.

Figure 16:
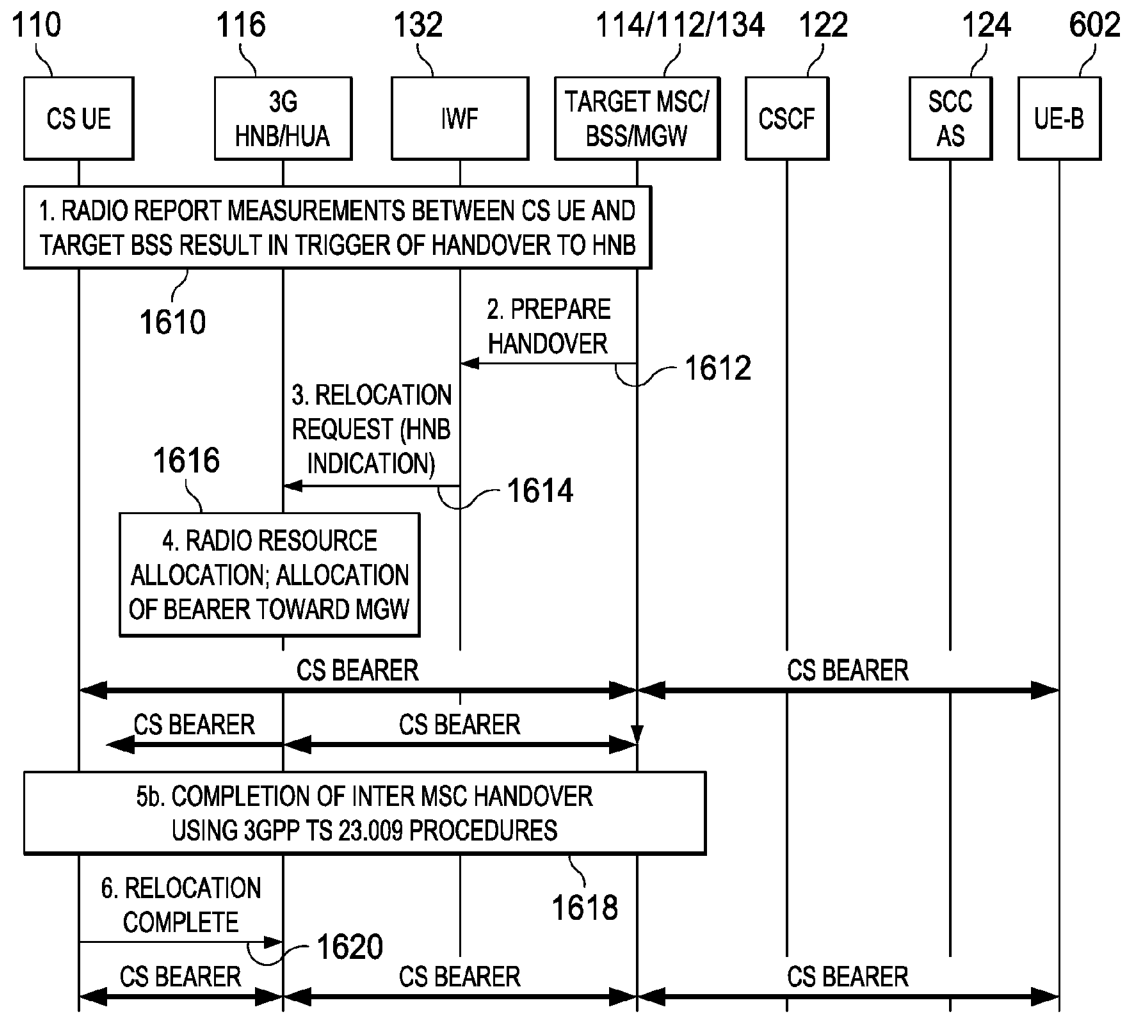
FIG. 16 is a message flow diagram for hand-in from the CS domain to the PS domain in accordance with yet another embodiment of the present invention.

FIG. 16 is a message flow diagram illustrating messages that may be used to affect a hand-in procedure such as that described above with reference to FIG. 15 in accordance with an embodiment of the present invention. Steps 1610-1620 of FIG. 16 are similar steps as steps 1410-1420 of FIG. 14, except that a CS bearer channel is establish between the MGW 134 and the HNB/HUA 116. As a result, the MGW 134 routes the CS bearer channel to the CS Core 114 rather than a PS bearer channel to the remote end.

Figure 17:
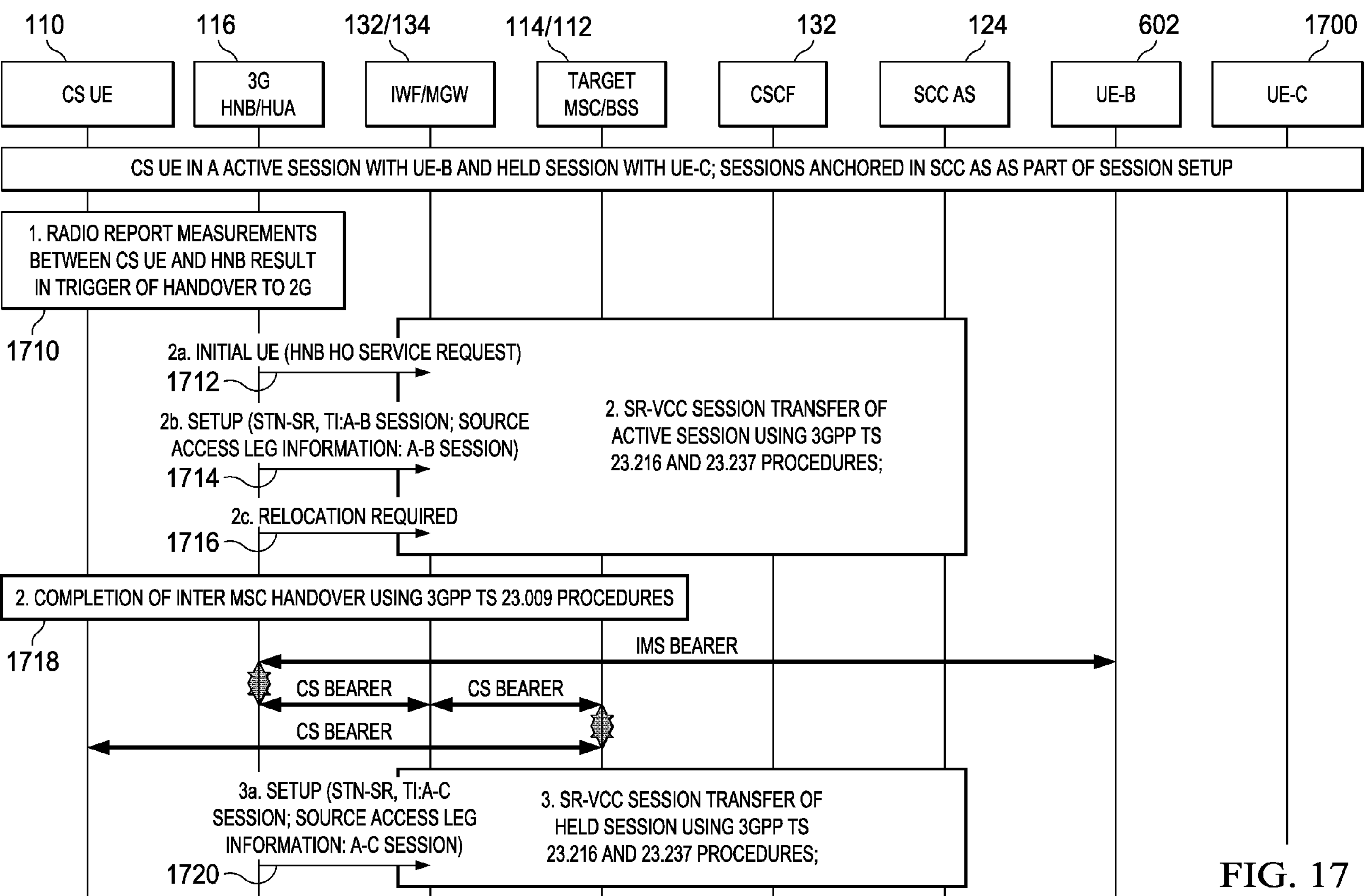
FIG. 17 is a message flow diagram for handover of multiple sessions from the PS domain to the CS domain in accordance with an embodiment of the present invention.

FIG. 17 is a message flow diagram illustrating messages that may be used to affect a handover in accordance with another embodiment of the present invention. The processes discussed above relate to a single session situation, i.e., situations in which the CS UE 110 has only a single session instantiated. FIG. 17, however, illustrates a message flow in which the CS UE 110 has two sessions—one session in the active state between the CS UE 110 and UE-B 602, and another session in the hold state between the CS UE 110 and UE-C 1700. In step 1710, radio measurements between the CS UE 110 and the HNB/HUA 116 trigger a handover from the HNB/HUA 116 to the macro CS.

Generally, RANAP as described in 3GPP TS 25.413, v8.3.0, which is incorporated herein by reference, defines an information element called Non-Access Stratum Protocol Data Unit (NAS PDU) (see clause 9.2.3.5 NAS PDU of 3GPP TS 25.413, v8.3.0), which is an Octet String used to embed NAS messages inside RANAP messages. For example, 3GPP TS 24.008, v8.6.0, messages are sent in Initial UE and Direct Transfer messages by embedding them in the NAS PDU information element of the respective RANAP message. An HNB implementation uses the NAS PDU Information Element (IE) such that it contains a "HNB Header" followed by the standard 3GPP TS 24.008, v8.6.0, message. The HNB Header may contain any HNB specific information related to the NAS procedure being requested by the RANAP message. For example, the HNB Header may be used to communicate the HNB Handover Service Request type in the Initial UE message sent by the HNB to the IWF (or MSC Server) to initiate handover to Macro CS. As another example, the HNB Header may be used to communicate voice session state information such as the held/active/conference/call transfer state or the information needed to identify the Source Access Leg for Session Transfer via a RANAP Direct Transfer message.

Referring back to FIG. 17, in steps 1712-1716, the HNB/HUA 116 initiates transfer of the active session in accordance with an embodiment. For example, in step 1712, the HNB/HUA 116 sends an Initial UE message with a CMSReq with a service type "Mobile Originated Call Establishment" and an indication of HNB Handover in the NAS PDU IE, thereby causing the IWF 132 to suppress the Authentication and Security procedures for the service request. Alternatively a new service type defined specifically for this purpose may be sent in CMSReq.

The indication of HNB handover is preferred with the CMSReq so that the IWF 132 is able to process CMSReq for normal mobile originations (e.g., for CS-Data, Fax, or Emergency calls) according to standard procedures, and suppress Auth/Security only for CMSReq used for HNB Handover. Alternatively, the IWF 132 may be configured to suppress Auth/Security for all CMSReq using service type equal to "Mobile Originated call establishment."

Next, in step 1714, the HNB/HUA 116 sends a Direct Transfer message with, for example, 3GPP TS 24.008, v8.6.0, Setup in its NAS PDU IE to establish the context for the active CS UE 110-UE-B 602 session. In the 3GPP TS 24.008, v8.6.0, Setup is included a STN to request a SR-VCC Session Transfer, and a 3GPP TS 24.008, v8.6.0, transaction identifier (TI) to identify the CS UE 110-UE-B 602 session for service control post transfer.

The 3GPP TS 24.008, v8.6.0, TI sent by the HNB/HUA 116 in 3GPP TS 24.008, v8.6.0, Setup is preferably the same as the TI allocated at establishment of the session that is being transferred so that the CS UE 110 can continue to use the same TI for service control post handover. The IWF 132 identifies a Setup with a STN from an HNB for special handling to process a TI that may be of the format of a TI used for CS termination, e.g., when transferring a session that was terminated to the CS UE 110 via the HNB access. The Direct Transfer message may optionally contain the Source Access Leg's STI to identify the Source Access Leg of the CS UE 110-UE-B 602 session established via HNB access. It may alternatively contain the connected party (UE-B 602) number as a means to identify the session. The STI and/or the UE-B 602 number may be provided in the 24.008 Setup message (e.g., in additional called party number IE or UU1 or Facility IE) and/or HNB header of the NAS PDU IE in RANAP Direct Transfer.

The STI of the source access leg may be needed to identify the source Access Leg to the SCC AS 124 for the purpose of Session Transfer and may be provided in the NAS PDU IE of RANAP Direct Transfer. Alternatively, the STI for the source access leg may be allocated to be the same as the 3GPP TS 24.008, v8.6.0, TI used for the session to be transferred; in which case, only the TI is sufficient.

Thereafter, in step 1716, the receipt of Setup message results in RAB Assignment procedure at the IWF 132 and the HNB/HUA 116 and the HNB/HUA 116 sends the Relocation Required message to initiate handover to target BSS 112. The IWF 132 then follows with completion of the procedure for transfer of the active CS UE 110-UE-B 602 session at the SCC AS 124. In parallel, the target resource allocation procedure takes place at the target MSC 114 resulting in completion of handover toward target BSS 112 and switching of the CS UE 110 from HNB/HUA 116 to target BSS 112. In step 1718, the inter-MSC handover procedure is completed using, for example, procedures defined in 3GPP TS 23.009, v8.1.0, which is incorporated herein by reference.

As illustrated in FIG. 17, an IMS bearer channel is established between the UE-B 602 and the HNB/HUA 116, and a CS bearer channel is established from the HNB/HUA 116 to the MGW 134 to the CS Core (MSC) 132 to the BSS 112 to the CS UE 110.

In step 1720, HNB/HUA 116 sends a Direct Transfer message with 3GPP TS 24.008, v8.6.0, Setup message in the NAS PDU IE to establish the context for the held CS UE 110-UE-C 1700 session. In the 3GPP TS 24.008, v8.6.0, Setup is included a STN-SR to request a SR-VCC Session Transfer and a 3GPP TS 24.008, v8.6.0, TI to identify the CS UE 110-UE-C 1700 session for service control post transfer. The Direct Transfer message may optionally contain the Source Access Leg's STI to identify the Source Access Leg of the CS UE 110-UE-C 1700 session established via HNB access. It may alternatively contain the connected party (UE-C) number as means to identify the session. The STI and/or the UE-C party number may be provided in the 3GPP TS 24.008, v8.6.0, Setup message (e.g., in additional called party number IE or UU1 or Facility IE) and/or HNB header of the NAS PDU IE in RANAP Direct Transfer. The IWF 132 then follows with completion of the procedure for transfer of the held CS UE 110-UE-C 1700 session at the SCC AS 124.

One of ordinary skill in the art will realize that the above process utilizes existing protocols and messages, such as the RANAP messages, to pass the information necessary to perform a handover. This reuse of existing messages has the benefit of having little or no impact existing systems.

Figure 18:
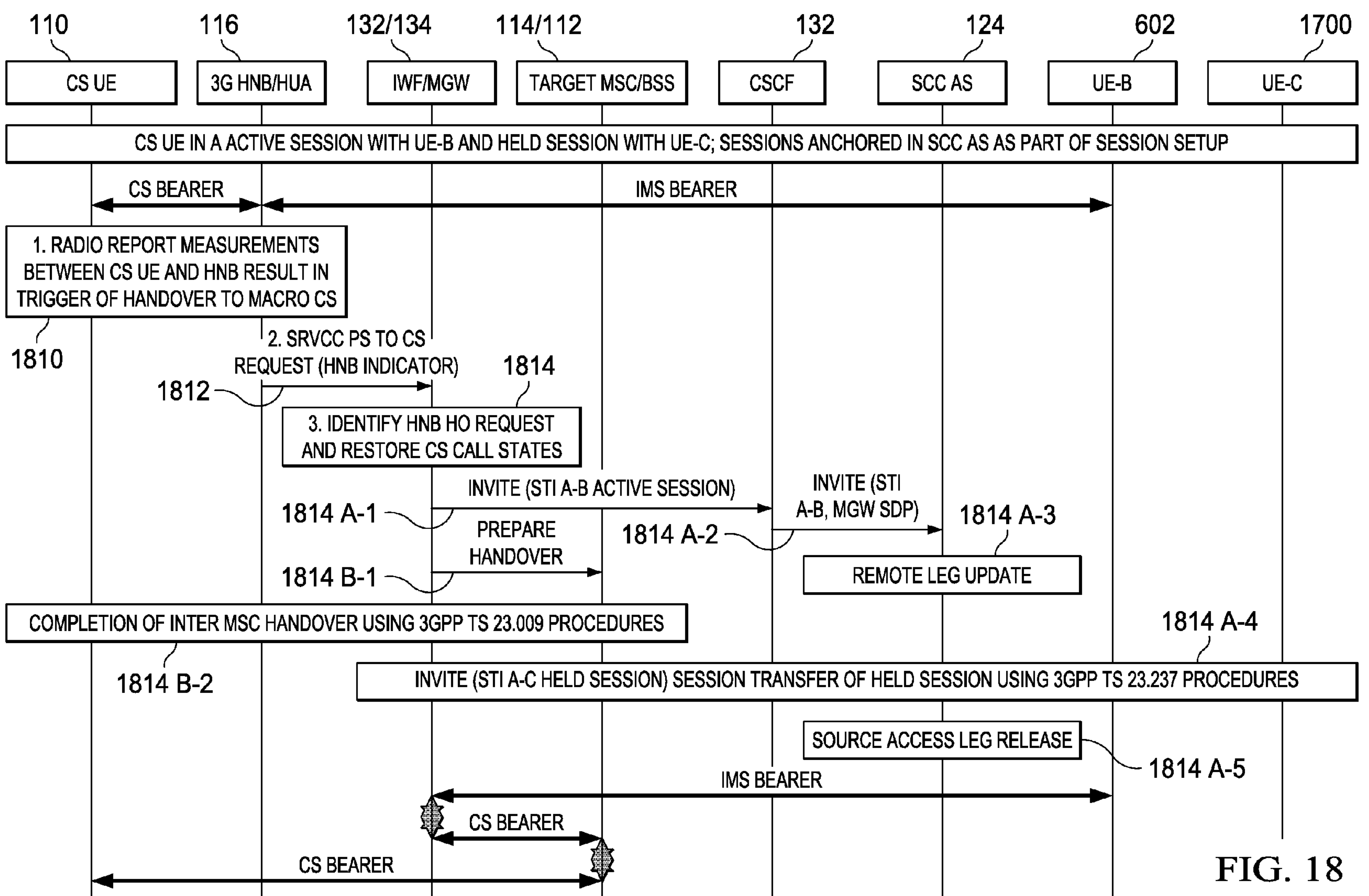
FIG. 18 is a message flow diagram for handover of multiple sessions from the PS domain to the CS domain in accordance with another embodiment of the present invention.

FIG. 18 is a message flow diagram illustrating messages that may be used to affect a handover using a single step initiation procedure in accordance with another embodiment of the present invention. As one will appreciate, the handover process discussed above with reference to FIG. 17 utilized a plurality of existing messages/steps to initiate the process. The process illustrated in FIG. 18, however, utilizes a single-step handover procedure from the PS domain to the CS domain, but may require a new message and/or message format.

Referring first to step 1810, radio measurements between the CS UE 110 and the HNB/HUA 116 trigger a handover from the HNB/HUA 116 to the macro CS. In step 1812, the HNB/HUA 116 initiates handover toward BSS/RNC 112 by transmitting an SRVCC PS to CS REQUEST message with an indication of HNB Handover in the PDU IE, so that the IWF 132 performs HNB specific actions described below with respect to step 1814 besides the ones for SRVCC.

It should be noted that the context of the sessions in HNB/HUA 116 may be included in the request message. The context may include each 3GPP TS 24.008, v8.6.0, TI and associated session state in order to restore the session states in the IWF and allow the CS UE 110 to continue to use the same TI as the TI allocated at establishment of the session that is being transferred for service control post handover.

The STI of the source Access Leg may also be provided to identify the source Access Leg to the SCC AS for the purpose of Session Transfer. The STI for the source Access Leg may be allocated to be the same as the 3GPP TS 24.008, v8.6.0, TI used for the session to be transferred, in which case only the TI may be sufficient. The STIs of the source Access Leg are associated with the session states in the HNB.

Furthermore, these TIs and/or STIs may be populated in sequence, thus the IWF 132 can initiate VCC session transfer according to the order given by HNB/HUA 116.

In an embodiment, the parameters mentioned to be transferred to the IWF above may be provided in the PDU IE of RANAP Relocation Required or in the PDU IE of SRVCC PS to CS Request message (shown in this case) defined for Sv interface.

In step 1814, the IWF determines this is an HNB triggered handover from femtocell to macro CS cell by the called indication of HNB and establishes the contexts for the sessions. In the SRVCC PS to CS Request is included STI(s) to request a Session Transfer and 3GPP TS 24.008, v8.6.0, TI(s) to identify the sessions for service control post transfer. Steps 1814A-1-1814A-5 and steps 1814B-1-1814B-2 identify the individual steps for this process.

In steps 1814A-1 and 1814A-2, the TI and/or STI of CS UE 110-UE-B 602 session is included in the request, so the IWF follows with completion of the procedure for transfer of the active CS UE 110-UE-B 602 session at the SCC AS 124. In step 1814A-3, the SCC AS completes the establishment of the Access Leg via the CS access. The SCC AS performs the Access Transfer by updating the Remote Leg with the connection information of the newly established Access Leg using the Remote Leg Update procedure. The SCC AS completes the session setup towards UE.

Next, in step 1814A-4, the IWF initiates the subsequent session transfer for the CS UE 110-UE-C 1700 held session according to the determined order. The procedure is basically the same as the steps of 1814A-1-1814A-3. The Source Access Leg (which is the Access Leg previously established over PS access) is released as defined in 3GPP TS 23.237, v9.1.0, as illustrated in step 1814A-5.

In step 1814B-1, in parallel the target resource allocation procedure takes place at the target MSC resulting in completion of handover toward target BSS/RNC and switching of the CS UE 110 from HNB/HUA 116 to the target BSS.

It should be noted the sequence of the steps 1814A-1-1814A5 and steps 1814B-1-1814B-2 is coordinated by the IWF as the same as SRVCC.

As illustrated in FIG. 18, an IMS bearer channel is established between the UE-B 602 and the MGW, and a CS bearer channel is established from the MGW 134 to the CS Core (MSC) 114 to the BSS 112 to the CS UE 110.

Figure 19:
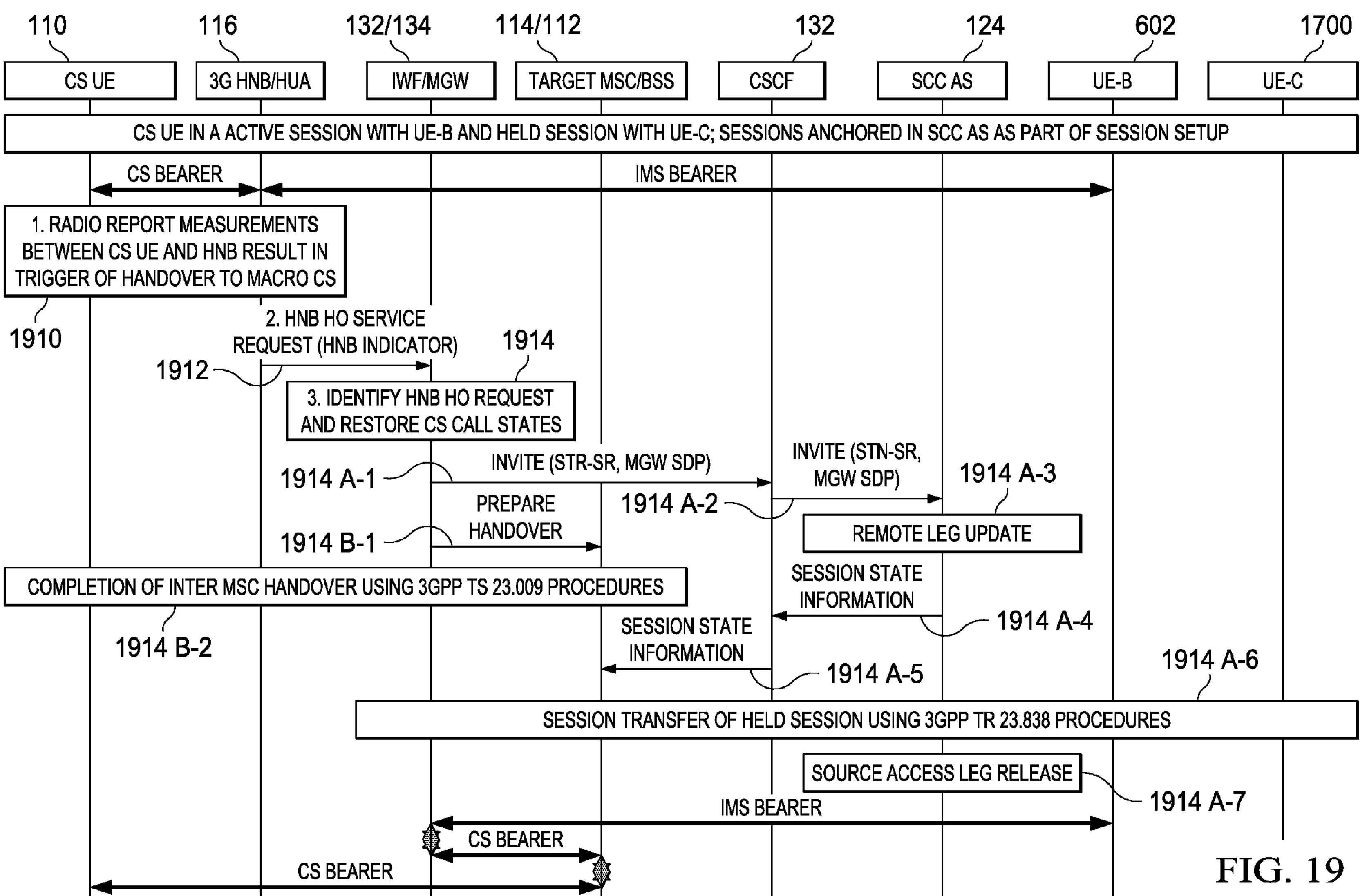
FIG. 19 is a message flow diagram for handover of multiple sessions from the PS domain to the CS domain in accordance with yet another embodiment of the present invention.

FIG. 19 is a message flow diagram illustrating messages that may be used to affect a handover using a single step initiation procedure in accordance with another embodiment of the present invention. Referring first to step 1910, radio measurements between the CS UE 110 and the HNB/HUA 116 trigger a handover from the HNB/HUA 116 to the macro CS. In step 1912, the HNB/HUA 116 initiates handover toward BSS/RNC by transmitting an SRVCC PS to CS Request message with an indication of HNB Handover in the PDU IE, so that the IWF performs HNB specific actions described below with respect to step 1914 besides the ones for SRVCC.

It should be noted that the context of the sessions in HNB/HUA 116 may be included in the request message. The context may include each 3GPP TS 24.008, v8.6.0, TI and associated session state in order to restore the session states in the IWF and allow the CS UE 110 to continue to use the same TI as the TI allocated at establishment of the session that is being transferred for service control post handover.

Furthermore, these TIs and/or STIs may be populated in sequence, thus the IWF can initiate VCC session transfer according to the order given by HNB/HUA 116.

In an embodiment, the parameters mentioned to be transferred to the IWF above may be provided in the PDU IE of RANAP Relocation Required or in the PDU IE of SRVCC PS to CS Request message (shown in this case) defined for Sv interface.

In step 1914, the IWF determines this is an HNB triggered handover from femtocell to macro CS cell by the called indication of HNB and establishes the contexts for the sessions. In the SRVCC PS to CS Request is included STI(s) to request a Session Transfer and 3GPP TS 24.008, v8.6.0, TI(s) to identify the sessions for service control post transfer. Steps 1914A-1-1914A-7 and steps 1914B-1-1914B-2 identify the individual steps for this process.

In steps 1914A-1 and 1914A-2, the TI and/or STI of CS UE 110-UE-B 602 session is included in the request, so the IWF follows with completion of the procedure for transfer of the active CS UE 110-UE-B 602 session at the SCC AS. In step 1914A-3, the SCC AS completes the establishment of the Access Leg via the CS access. The SCC AS performs the Access Transfer by updating the Remote Leg with the connection information of the newly established Access Leg using the Remote Leg Update procedure. The SCC AS completes the session setup towards UE.

Next, in steps 1914A-4 and 1914A-5, the SCC AS provides session state information on additional active and inactive sessions with speech media including needed STIs on the transferring-in leg. In step 1914A-6, the IWF initiates the subsequent session transfer for the CS UE 110-UE-C 1700 held session according to the determined order. The procedure is basically the same as the steps of 1914A-1-1914A-3. The Source Access Leg (which is the Access Leg previously established over PS access) is released as defined in 3GPP TS 23.237, v9.1.0, as illustrated in step 1914A-5.

In step 1914B-1, in parallel the target resource allocation procedure takes place at the target MSC resulting in completion of handover toward target RNC/BSC and switching of the CS UE 110 from HNB/HUA 116 to the target BSS.

It should be noted the sequence of the steps 1914A-1-1914A-5 and steps 1914B-1-1914B-2 is coordinated by the IWF as the same as SRVCC.

As illustrated in FIG. 19, an IMS bearer channel is established between the UE-B 602 and the MGW 134, and a CS bearer channel is established from the MGW 134 to the CS Core (MSC) 114 to the BSS 112 to the CS UE 110.

With respect to FIGS. 18 and 19, the IWF performs IMS Registration for the UE when using the I2 interface. The sequence of the A-series of steps and the B-series of steps may be coordinated by the IWF as the same as SRVCC.

Additional reference may be made to 3GPP TS 29.280, v8.1.0, 3GPP EPS Sv Interface (MME to MSC) for SRVCC, which is incorporated herein by reference.

The IE for the SRVCC PS to CS REQUEST message may include, among other things, the IMSI, the address for control plane messages that are chosen by the source mobility management entity (MME)/SGSN, the tunnel for the control plane message, the Mobile Subscriber Integrated Services Digital Network Number (MSISDN), STN-SR, and the CS security key in mobility management (MM) context for SRVCC.

A SRVCC PS to CS Request message, such as that discussed above with reference to step 1812 of FIG. 18, may be sent across Sv interface from the MME/SGSN to the target MSC server as part of the MME/SGSN SRVCC procedure as defined in 3GPP TS 23.216, v9.0.0, which is incorporated herein by reference. (See also 3GPP TS 25.413, v8.3.0, which is incorporated herein by reference.) Table 1 defines the IEs of this message in accordance with an embodiment of the present invention. Additional or fewer IEs may be included in other embodiments.

TABLE 1

| Information elements | P | Condition/Comment | CR | IE Type |
|---|---|---|---|---|
| IMSI | M | None | 1 | IMSI |
| MME/SGSN Sv Address for Control Plane | M | This IE specifies the address for control plane message which is chosen by the source MME/SGSN. | 1 | IP-Address |
| MME/SGSN Sv TEID for Control Plane | M | This IE specifies the tunnel for control plane message which is chosen by the source MME/SGSN. The target MM may include this TEID in the GTP header of all related control plane messages which are related to the requested bearer. | 1 | TEID-C |
| MSISDN | M | The MME/SGSN may include MSISDN IE. | 1 | MSISDN |
| STN-SR | M | The MME/SGSN may include STN-SR IE. | 1 | STN-SR |
| MM Context for SRVCC | M | The MME/SGSN may include CS Security key in MM Context for SRVCC. The derivation of the CS security keys may follow the procedures defined 3 GPP TS 33.401, v9.0.0, which is incorporated herein by reference. | 1 | MM Context for SRVCC |
| Source to Target Transparent Container | C | The Source to Target Transparent Container may be used to transfer HNB handover specific information. | 1 | Handover-specific Information |
| Private Extension | O | None | 1 | Private Extension |

Furthermore, Table 2 illustrates the IEs for the Relocation Required message that may be used in conjunction with step 1812 of FIG. 18 and/or setup 1912 of FIG. 19, in accordance with an embodiment of the present invention. The paragraph numbers in the IE Type and Reference column refers to the paragraph number of 3GPP TS 25.413, v8.3.0, which is incorporated herein by reference, at which additional information may be found. This message is sent from the RNC to the CN and is connection oriented.

TABLE 2

| IE/Group Name | Presence | Range | IE type and reference | Semantics description | Criticality | Assigned Criticality |
|---|---|---|---|---|---|---|
| Message Type | M | | 9.2.1.1 | | YES | Reject |
| Relocation Type | M | | 9.2.1.23 | | YES | Reject |
| Cause | M | | 9.2.1.4 | | YES | Ignore |
| Source ID | M | | 9.2.1.24 | | YES | Ignore |
| Target ID | M | | 9.2.1.25 | | YES | Reject |
| MS Classmark 2 | C - ifGSMCStarget | | 9.2.1.26 | | YES | Reject |
| MS Classmark 3 | C - ifGSMCStarget | | 9.2.1.27 | | YES | Ignore |
| Source To Target Transparent Container | C - ifUMTStarget or ifEUTRAtarget | | 9.2.1.30A | | YES | Reject |
| Old BSS To New BSS Information | O | | 9.2.1.29 | Can optionally be used if GSM target, but not used for UMTS target. | YES | Ignore |
| GERAN Classmark | O | | 9.2.1.57 | | YES | Ignore |
| Source BSS To Target BSS Transparent Container | O | | 9.2.1.79 | May be included, particularly if GSM PS domain is target. | YES | Ignore |

| Condition | Explanation |
|---|---|
| ifGSMCStarget | This IE may be present if the Target ID IE contains a CGI IE and Source BSS To Target BSS Transparent Container is not included. |
| ifUMTStarget | This IE may be present if the Target ID IE contains a Target RNC-ID IE. |
| ifEUTRAtarget | This IE may be present if the Target ID IE contains a Target eNB-ID IE or if the Target ID IE contains a Target RNC-ID IE containing a Corresponding RNC-ID. |

As one of ordinary skill in the art will appreciate, various embodiments of the invention provide a multitude of advantages. For example, the implementation can be fully scalable since it places the SIP in customer premise equipment. In addition, it completely offloads the CS Core network of the session control signaling. It also provides service continuity with CS as well as PS macro cellular. The placement of the SIP UA in the home premise equipment enables enrichment of subscriber experience with subscriber based SIP features such as picture caller id. Further, embodiments place mobility functions in the transport layer, as opposed to some other approaches that place these functions in the application layer thereby requiring tunneling of transport layer information in application layer signaling.

Figure 20:
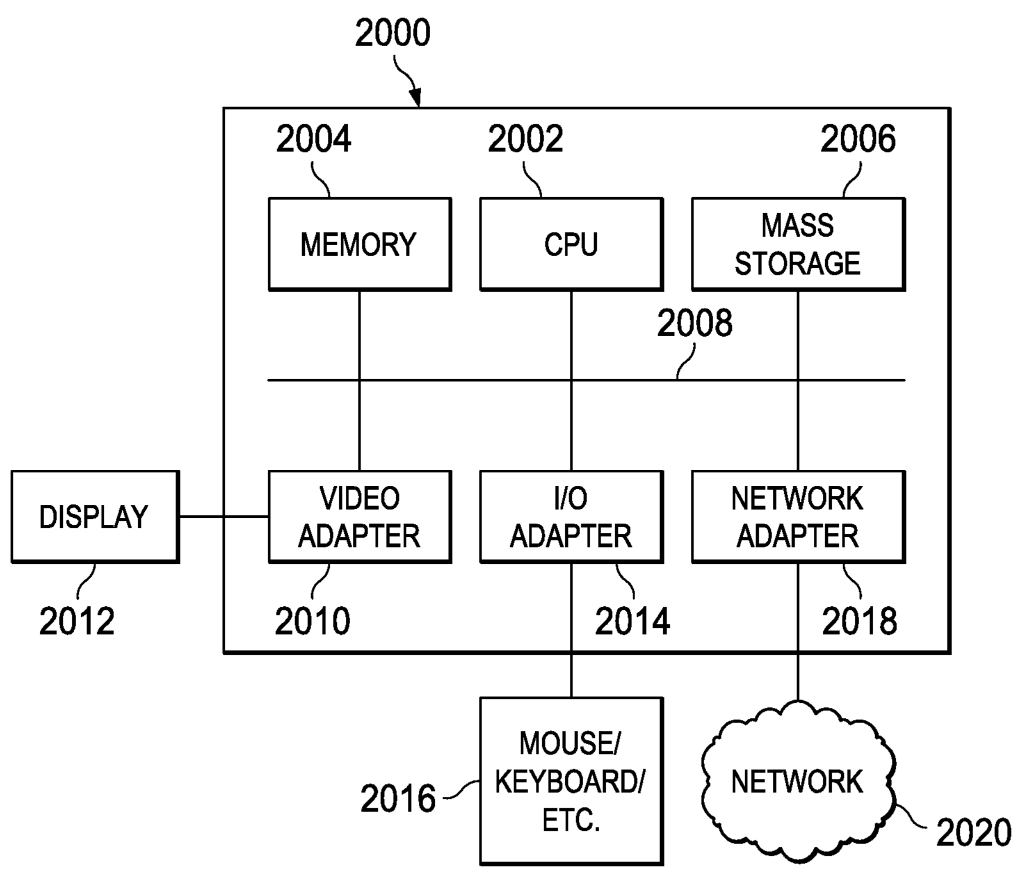
FIG. 20 is a block diagram of a network element in accordance with an embodiment of the present invention.

Referring now to FIG. 20, a block diagram of a network element 2000 is provided in accordance with an embodiment of the present invention. The network element 2000 depicts a general purpose platform and the general components and functionality that may be used to implement any or all of the CS UE 110, the SCC AS 124, CSCF 122, HNB/HUA 116, HNB GW 120, MGW 134, IWF 132, MRF 910, and/or the like. The network element 2000 may include, for example, a central processing unit (CPU) 2002, memory 2004, and a mass storage device 2006 connected to a bus 2008 configured to perform the processes discussed above. The network element 2000 may further include, if desired or needed, a video adapter 2010 to provide connectivity to a local display 2012 and an I/O Adapter 2014 to provide an input/output interface for one or more input/output devices 2016, such as a mouse, a keyboard, printer, tape drive, CD drive, or the like.

The network element 2000 also includes a network Adapter 2018, which may be a wired link, such as an Ethernet cable or the like, and/or a wireless/cellular link for communications with a network 2020. In an embodiment, the network interface 2018 comprises a switching fabric for switching bearer and signaling channels. The network interface 2018 may also comprise a suitable receiver and transmitter for wireless communications. It should be noted that the network element 2000 may include other components. For example, the network element 2000 may include power supplies, cables, a motherboard, removable storage media, cases, and the like. These other components, although not shown, are considered part of the network element 2000.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that different network elements, messaging, protocols, and/or the like may be varied while remaining within the scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for performing wireless communications, the method comprising:

receiving an access gateway register request for a user equipment (UE), the access gateway register request indicating a network address for an access gateway and a subscriber identifier, the access gateway being configured to route user data therethrough, wherein the UE is a legacy CS device that lacks the functionality to communicate directly with a packet switched (PS) network;

verifying that the UE was previously registered in a user database during a circuit switch (CS) attach procedure; and pursuant to said verification, storing the network address for the access gateway and transmitting a register acknowledgement message, wherein the CS attach procedure is performed by a home user agent which separates a CS attach request received from the UE into a session control component and a mobility component, the mobility component corresponding to the CS attach procedure and the session control component corresponding to an internet protocol (IP) multimedia subsystem (IMS) attach procedure.

2. The method of claim 1, wherein the user database is a home location register.

3. The method of claim 1, wherein the access gateway is a home node B gateway.

4. The method of claim 1, wherein the subscriber identifier is an international mobile subscriber identity (IMSI).

5. A method for performing wireless communications, the method comprising:

facilitating a circuit switch (CS) attach procedure between a user equipment (UE) and an inter-working function (IWF), the IWF acting as a mobile switching center (MSC) for the UE, the UE being a legacy CS device that is incapable of communicating directly through internet protocol (IP) multimedia subsystem (IMS) signaling;

transmitting an access gateway register request that indicates a network address for an access gateway and a subscriber identifier assigned to the UE, wherein the access gateway register request triggers a verification that the subscriber identifier was registered during the CS attach procedure, and said verification triggering a storage of the network address for the access gateway, and wherein the access gateway is an access point for the CS device to access the PS network; and receiving an access gateway register acknowledgement message, the access gateway register acknowledgement message indicating that the CS device is verified, wherein the CS attach procedure is performed by a home user agent which separates a CS attach request received from the UE into a session control component and a mobility component, the mobility component corresponding to the CS attach procedure and the session control component corresponding to an IMS attach procedure.

6. The method of claim 5, wherein the network address is stored in a home location register.

7. The method of claim 5, wherein the access gateway is a home node B.

8. The method of claim 5, wherein the subscriber identifier is an international mobile subscriber identity (IMSI).

9. A method for performing wireless communications, the method comprising:

receiving an IP multimedia system (IMS) access authorization request for a user equipment (UE) from an access point, the IMS access authorization request indicating a network address for the access point and a subscriber identifier associated with the UE, wherein the UE is a legacy circuit switch (CS) device that lacks the functionality to communicate via IMS signaling;

verifying that the UE was registered via a circuit switch network during an earlier CS attach procedure; and pursuant to said verification, storing the network address for the access point, and transmitting an IMS access authorization acknowledgement message, wherein the CS attach procedure is performed by a home user agent which separates a CS attach request received from the UE into a session control component and a mobility component, the mobility component corresponding to the CS attach procedure and the session control component corresponding to an IMS attach procedure.

10. The method of claim 9, wherein the IMS access authorization request is transmitted from the access point via an access gateway.

11. The method of claim 10, wherein the access gateway is a home node B gateway.

12. The method of claim 9, wherein the verifying includes verifying the subscriber identifier with a home location register.

13. The method of claim 9, wherein the subscriber identifier is an international mobile subscriber identity (IMSI).

14. A method for performing wireless communications, the method comprising:

facilitating a circuit switch (CS) attach procedure between a user equipment (UE) and an inter-working function (IWF), the IWF acting as a mobile switching center (MSC) for the UE;

transmitting, by an access point, an IMS access authorization request, the IMS access authorization request indicating a network address for an access point and a subscriber identifier for the UE, wherein the UE is a legacy CS device that is incapable of communicating directly via internet protocol (IP) multimedia subsystem (IMS) signaling, and wherein the access authorization request triggers a verification that the subscriber identifier was registered during the CS attach procedure; and receiving a register acknowledgement message, the register acknowledgement message indicating that the UE is verified, wherein the CS attach procedure is performed by a home user agent which separates a CS attach request received from the UE into a session control component and a mobility component, the mobility component corresponding to the CS attach procedure and the session control component corresponding to an IMS attach procedure.

15. The method of claim 14, wherein the verification that the subscriber identifier is registered is performed by accessing a home location register.

16. The method of claim 14, wherein the access point is a home node B.

17. The method of claim 14, wherein the subscriber identifier is an international mobile subscriber identity (IMSI).

* * * * *